(12) United States Patent
Larsen et al.

(10) Patent No.: US 6,844,656 B1
(45) Date of Patent: Jan. 18, 2005

(54) ELECTRIC MULTIPOLE MOTOR/ GENERATOR WITH AXIAL MAGNETIC FLUX

(75) Inventors: Kim Dam Larsen, Nykøbing (DK); Peter Rasmussen, Svendborg (DK); Uffe Dam Larsen, Copenhagen (DK)

(73) Assignee: NEG Micon Control Systems A/S, Hammel (DK)

( * ) Notice: Subject to any disclaimer, the term of this patent is extended or adjusted under 35 U.S.C. 154(b) by 0 days.

(21) Appl. No.: 09/889,877

(22) PCT Filed: Feb. 9, 2000

(86) PCT No.: PCT/DK00/00054
§ 371 (c)(1),
(2), (4) Date: Aug. 6, 2001

(87) PCT Pub. No.: WO00/48297
PCT Pub. Date: Aug. 17, 2000

(30) Foreign Application Priority Data
Feb. 10, 1999 (DK) .......................................... 1999 00177

(51) Int. Cl.⁷ ................................................. H02K 1/22
(52) U.S. Cl. ........................ 310/268; 310/181; 310/185; 310/258
(58) Field of Search ................................ 310/268, 179, 310/180, 181, 185, 191, 199, 90, 258

(56) References Cited

U.S. PATENT DOCUMENTS

| | | | |
|---|---|---|---|
| 3,482,131 A | | 12/1969 | Lytle |
| 4,159,434 A | * | 6/1979 | Kalsi ........................... 310/168 |
| 4,321,495 A | * | 3/1982 | Kennedy ..................... 310/164 |
| 4,363,988 A | * | 12/1982 | Kliman ........................ 310/268 |
| 4,710,667 A | * | 12/1987 | Whiteley ..................... 310/268 |
| 5,168,187 A | * | 12/1992 | Baer et al. ................. 310/49 R |
| 5,436,518 A | | 7/1995 | Kawai |
| 5,642,009 A | | 6/1997 | McCleer et al. |
| 6,114,788 A | * | 9/2000 | Vuillemin (Muller) et al. .. 310/90.5 |
| 6,177,746 B1 | * | 1/2001 | Tupper et al. ............... 310/166 |

FOREIGN PATENT DOCUMENTS

| | | |
|---|---|---|
| DE | 42 23 836 A1 | 1/1994 |
| DE | 195 45 680 A1 | 6/1997 |
| EP | 0 162 927 A1 | 12/1985 |
| EP | 0 225 616 A1 | 6/1987 |
| SU | 1096736 A | 6/1984 |
| WO | WO 96/29774 | 9/1996 |
| WO | WO 98/26495 | 6/1998 |
| WO | WO 99/48187 | 9/1999 |

* cited by examiner

Primary Examiner—Thanh Lam
(74) Attorney, Agent, or Firm—Oliff & Berridge, PLC

(57) ABSTRACT

This invention relates to an electric multiple motor/generator with axial magnetic flux. Thus a generator/motor or electrical machine in which a magnetic flux path through one or more pole legs or pole cores surrounded by current windings or coils is provided. This allows a high density of the magnetic flux to be passed through the pole legs or cores, which results in a low consumption of material for the pole legs or pole cores compared with prior art machines, where for example a large stator diameter may be needed in order to conduct a high magnetic flux. Additionally the generator/motor or electrical machine is very efficient both at a low and a high number of revolutions. According to another aspect of the invention a multiple phase output without enlarging the diameter of the generator is provided.

40 Claims, 23 Drawing Sheets

ELECTRIC MULTIPOLE MOTOR/ GENERATOR WITH AXIAL MAGNETIC FLUX

FIELD OF INVENTION

This present invention relates to an electrical machine, and more particularly to a synchronous machine. The electrical machine can operate either as a motor or generator, as will be described later and will just be called generator in the following.

BACKGROUND OF THE INVENTION

Electrical generators may be used in many different fields. When a generator is e.g. used in a wind turbine, one of the more important economic parameters, with respect to the dimensioning of the wind turbine, is the size of the housing. It is therefore of great importance to be able to minimize the diameter of the wind turbine. In order to minimize the housing one has to minimize the gearbox/gear wheel connecting the wing and the generator. This can be achieved by providing a generator that has a relatively large effect per revolution.

One way to achieve this is to have a generator with as small a radial extent as possible, since the generator occupies a relative large amount of space in the housing of the wind turbine.

Another aspect to be considered when implementing generators in wind turbines is that the generator has to be effective both at a low and a high number of revolutions.

An electrical machine based on a conventional radial flux generator (see FIG. 1) is most frequently used.

A main problem with generators of this kind in certain situations is that the diameter for a given power output is relatively large, because of the radially built stator construction.

A further disadvantage is that the stator surrounds/encircles the rotor, thereby adding to the diameter of the generator.

Another disadvantage is the relative low induction in the air gap caused by the individual arrangement of the material between the recess (7) and the recess (2) themselves, since only the material (7) carries the flux and only covers about 50% of the free space toward the gap.

A further disadvantage is the use of coil material which serves no other purpose than connecting the wound coils (3) located in the recess (2).

Another disadvantage is the complex procedure performed in connection with the insertion of the coils (3) through the narrow openings in the recess (2).

There are many generators of similar kind which are optimized in one way or another, but they all have a radial flux and thus involve the same problem, i.e. a relatively larger diameter, like the one described above.

SUMMARY OF THE INVENTION

According to a first aspect of the present invention there is provided an electrical machine comprising: a rotor secured to a shaft with an axis of rotation, one or more magnets or means for producing a magnetic field, a stator with air gap(s) formed between the rotor and the stator, and one or more current windings or coils wound on and surrounding pole legs or pole cores, said pole legs or pole cores providing part(s) of one or more magnetic flux paths.

Preferably, the machine comprises a plurality of pole cores or pole legs with windings or coils. Here it is preferred that separate pole cores or pole legs have corresponding separate coils or sets of windings surrounding said pole cores or pole legs. Preferably, each separate pole core has a corresponding separate coil or set of windings.

Thus, it is an object of the present invention to provide a generator/motor or electrical machine in which a magnetic flux path is provided through one or more pole legs or pole cores surrounded by current windings or coils. When a separate pole leg or core is surrounded by a corresponding separate coil, a high density of the magnetic flux is allowed to be passed through the pole leg or core, which results in a low consumption of material for the pole legs or pole cores compared with prior art machines, where for example a large stator 4 diameter may be needed in order to conduct a high magnetic flux.

By having the coils wound on and/or surrounding pole cores, a pole core or part of a pole core may be arranged in any convenient direction including a substantially axial direction. Consequently, the present invention provides a generator/motor which may have a relatively small diameter. It should be understood that the first aspect of the present invention covers several embodiments. In a first preferred embodiment the magnets or means for producing a magnetic field are arranged in the rotor, and the pole legs or pole cores are arranged in the stator. In a second preferred embodiment the magnets or means for producing a magnetic field are arranged in the stator, and the pole legs or pole cores are arranged in the rotor.

When arranging the pole cores, they may be arranged so that at least a portion of one or more of the pole cores is arranged parallel to or at an angle with the axis of rotation. Thus, the angle may be equal to or greater than 0 degrees and below 90 degrees. Here, the angle may be below 45 degrees, or below 30 degrees.

However, it is preferred that at least a portion of one or more of the pole cores is substantially parallel to the axis of rotation, thereby allowing a design with a small diameter. The coils are wound around the pole cores, so that one or more windings or coils may have their axes substantially parallel to the axis of rotation.

The pole cores may also be arranged so that at least a portion of a pole core is substantially perpendicular to the axis of rotation of the shaft. A coil or winding may be wound on the part of the pole core which is substantially perpendicular to the axis of rotation, but the coil may also be wound on another part of the pole core, said other part having a different direction. Thus, one or more windings or coils may have their axes substantially perpendicular to the axis of rotation.

The rotor may be arranged so that at least part of the rotor is substantially perpendicular to the axis of rotation. It is also preferred that the rotor is circular.

When arranging the magnets or means for producing magnetic fields and the pole cores, it is preferred that they are arranged so that a magnetic flux path includes flux paths through two pole cores. However, the present invention also covers an embodiment in which a magnetic flux path includes a flux path through a pole core and the rotor shaft. Here, two rotors may be used, said rotors being arranged substantially opposite to said shaft.

According to the present invention, air gaps are formed between the rotor and the stator, where pole cores are part of the stator or the rotor. Here, it is preferred that for one separate pole core or pole leg there is only one corresponding air gap. Preferably, for each separate pole core, there is one and only one air gap between the stator and the rotor. Thus, for a magnetic flux path including two and only two pole cores, the magnetic flux path will include two and only two air gaps.

For embodiments of the invention having one rotor, it is preferred that the stator further comprises a magnetic conductive end plate that is connected to the pole legs or cores. Here, the end plate should be substantially parallel and opposite to the rotor.

When arranging the magnets or means for producing a magnetic field and the poles, they may be arranged so that the number of pole cores equals the number of magnets or means for producing a magnetic field.

It should be understood that the present invention covers embodiments with different arrangements of the magnets or means for producing a magnetic field. Thus, they may be located radially and equidistantly in the rotor. They may also be located on one side of the rotor facing ends of the pole cores. Alternatively, they may be located on the outer periphery of the rotor.

It is preferred that the machine according to the present invention further comprises pole shoes. These may preferably be arranged between the magnets or means for producing a magnetic field.

It should also be understood that the magnets or means for producing a magnetic field may be arranged so as to concentrate the magnetic flux in the air gap.

Thus, according to a second object of the present invention there is provided an electrical machine comprising: a rotor secured to a shaft with an axis of rotation, one or more magnets or means for producing a magnetic field, a stator with air gap(s) formed between the rotor and the stator, and one or more current windings or coils. Here, the magnets or means for producing a magnetic field are arranged so as to fit substantially into a V, U or L-shape, thereby concentrating the flux in the air gap. It is preferred that the coils or windings are wound on and surrounding the pole legs or pole cores, so that the V, U or L-shape arrangement of the magnets or means for producing a magnetic field may also be used in any of the embodiments of the first aspect of the present invention.

The V or L-shape may be obtained by having the magnets or the means for producing a magnetic field arranged in pairs to obtain said V or L-shape.

It should be understood that when arranging the magnets or means for producing a magnetic field into a V-shape, the magnets or means for producing a magnetic field may be arranged to fit substantially into two or more V-shapes.

For embodiments of the present invention having pole cores arranged in the rotor, it is preferred that the pole cores are arranged in the rotor so that, for a pole core, at least a part of the pole core is substantially perpendicular to the axis of rotation. However, a pole core or a part of a pole core may also be arranged at an angle with the axis of rotation, said angle being less than 90 degrees.

When the pole cores are arranged in the rotor, the magnets or means for producing a magnetic field may be located in the stator facing ends of the pole cores. The magnets or means for producing a magnetic field may be arranged in the stator to fit substantially into a V, U or L-shape in order to concentrate the magnetic flux.

In embodiments of the present invention wherein the machine comprises a plurality of magnets or means to be magnetized, it is preferred that said plurality is arranged in pairs having poles of similar polarity facing each other.

It should be understood that according to the present invention, the magnets and/or the means for producing a magnetic field may be permanent magnets or electromagnets.

When producing the windings or coils of the machines described above, it is preferred to use a flat concentrated coil. When producing the pole cores, it is preferred that these are made of a magnetic conducting material, said conducting material being preferably a field oriented soft magnetic lamination.

The machine according to the embodiments of the present invention may preferably be formed as a synchronous one phase machine. The machine may have the form of a generator which may be provided with a mechanical force/power via the shaft to generate an electrical power via the windings, or the machine may have the form of a motor which may be provided with power from an electrical source via the windings to generate a mechanical force/power via the shaft.

It should be understood that a generator according to embodiments of the present invention may be well suited to be used in a wind turbine.

A further object of the present invention is to provide a machine or generator/motor which may provide a multiple phase output without enlarging the diameter of the generator. The multiple number of phases may be achieved by arranging a corresponding number of one phase machines according to any of the above mentioned embodiments in series.

According to a preferred embodiment of the present invention, wherein the pole cores or pole legs are arranged in the stator, the pole legs or pole cores may be formed by substantially U-shaped elements. Here, the substantially U-shaped elements may be arranged in the stator so that one pole leg or pole core is formed by two adjacent legs of two U-shaped elements.

When designing a stator with pole legs for a machine of the present invention, it is preferred that the pole legs are arranged so that the width of a pole leg or pole core is substantially equal to the distance between two successive pole legs. Thus, for a U-shaped pole core element, the distance between the two legs should preferably be substantially equal to twice the width of a single leg.

For embodiments of the present invention having pole shoes arranged in the rotor, it is preferred that the width of a pole shoe at the outer periphery of the rotor is substantially equal to the width of a pole core or pole leg oppositely arranged in the stator.

It is also a purpose of the present invention to provide a method of producing the above mentioned U-shaped pole core elements. Thus, according to a further aspect of the present invention, there is provided a method of producing a substantially U-shaped pole core element, said method comprising winding sheet metal or transformer sheet metal around an oval shaped body or mould to obtain an oval shaped element of transformer sheet metal, and dividing said oval shaped element of transformer sheet metal in two substantially equal parts to thereby obtain two U-shaped pole core elements.

The U-shaped pole core elements may alternatively be produced by punching or stamping the U-shape in sheets of transformer sheet metal and then stacking a number of the stamped sheets or layers in order to obtain a desired thickness of the U-shaped pole core element.

When using the above mentioned U-shaped pole core elements, a magnetic flux path going through two pole cores will have its path in both legs of one U-shaped pole core element. In a preferred embodiment of the present invention, the U-shaped pole core elements are arranged on a stator end plate. However, when a magnetic flux path is going through a U-shaped element, there is no need for introducing a magnetic loss by having a flux path in the stator end plate.

Thus, it is preferred that the U-shaped pole legs or pole cores are made of a magnetic conducting material. It is also preferred that the stator end plate is made of a material have a low magnetic conductivity. It is further preferred that the stator end plate is made of a material having a low electronic conductivity.

When the magnets or means for producing a magnetic field are arranged in the rotor as discussed above, it is also within the present invention to provide an electrical machine, wherein a first stator is arranged opposite to and facing a first side of the rotor, and a second stator is arranged opposite to and facing the other or second side of the rotor. Here, both sides of the rotor have magnets or means for producing a magnetic field, and pole cores or pole legs of the first stator are facing the first side of the rotor, while pole cores or pole legs of the second stator are facing the second side of the rotor.

Thus, a machine according to the present invention in its most simple form may comprise one or more elements formed by one stator part and one rotor part. However, in a preferred embodiment the machine may comprise one or more elements formed by one rotor part with two corresponding stator parts.

BRIEF DESCRIPTION OF THE DRAWINGS

The invention will be explained more fully below in connection with some preferred embodiments and with reference to the accompanying drawings, in which:

FIG. 6b illustrates a schematic longitudinal sectional view of the embodiment shown in FIG. 6a;

DETAILED DESCRIPTION OF THE INVENTION

Figure 1:
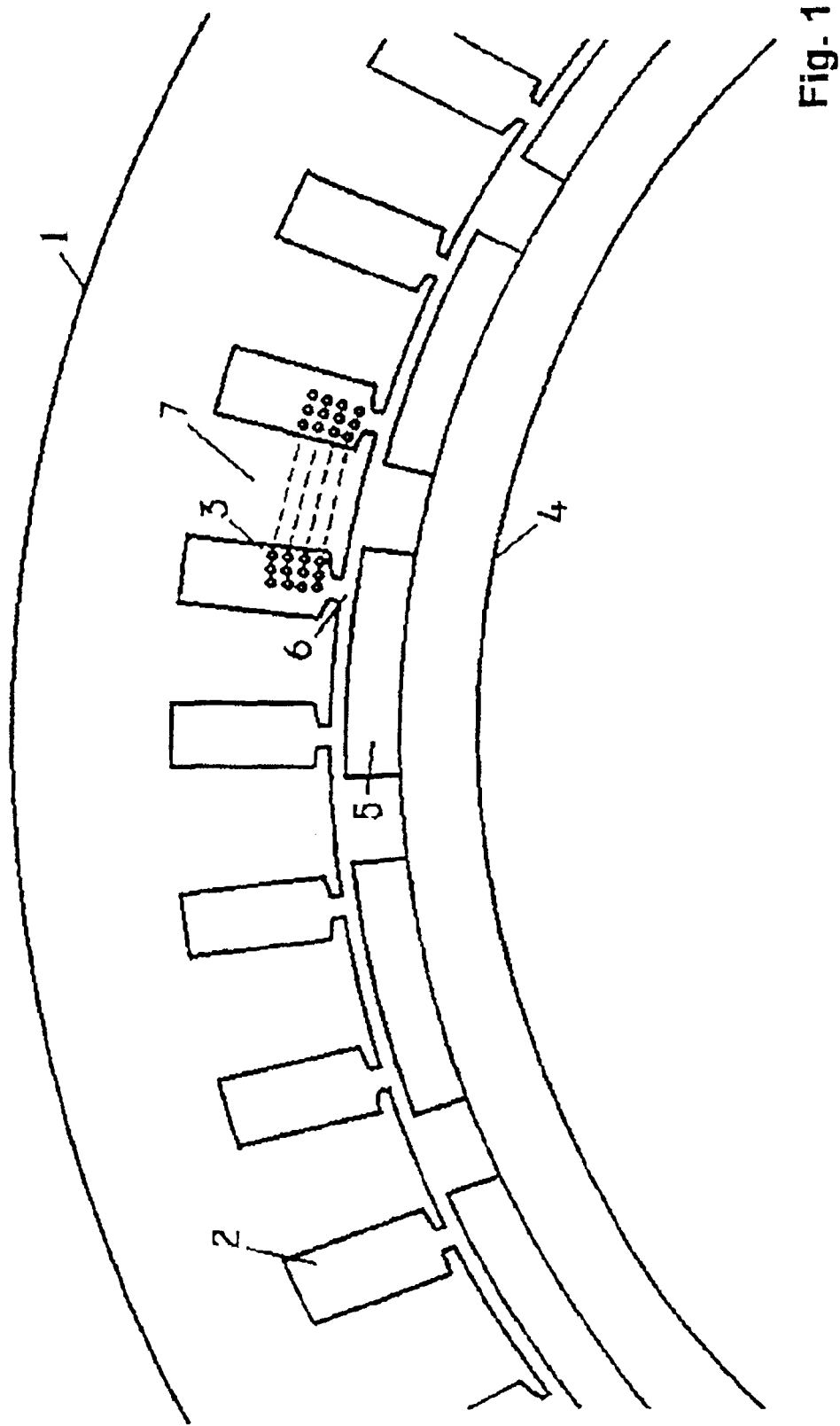
FIG. 1 shows a sectional view of a part of a generator according to the prior art.

FIG. 1 shows a sectional view of a part of a generator according to the prior art. The figure shows a stator (1) which has recesses (2) with coils (3) wound in the traditionally manner, i.e. from a given recess to another, depending on the phases of the current generated. Also shown is a rotor (4) with magnets (5) spaced apart from the boundary of the rotor (4). Between the magnets (5) on the rotor (4) and the stator (1) there is an air gap.

When the rotor (4) moves via a shaft (not shown) with respect to the stator (1), the magnets (5) are moved past the coils (3) and current is thus induced in these.

If current is supplied to the coils (3), a magnetic field will make the rotor (4) and the shaft move, and the electrical machine functions as a motor.

The construction according to the prior art has the disadvantages already mentioned in the Background of the Invention.

Figure 2:
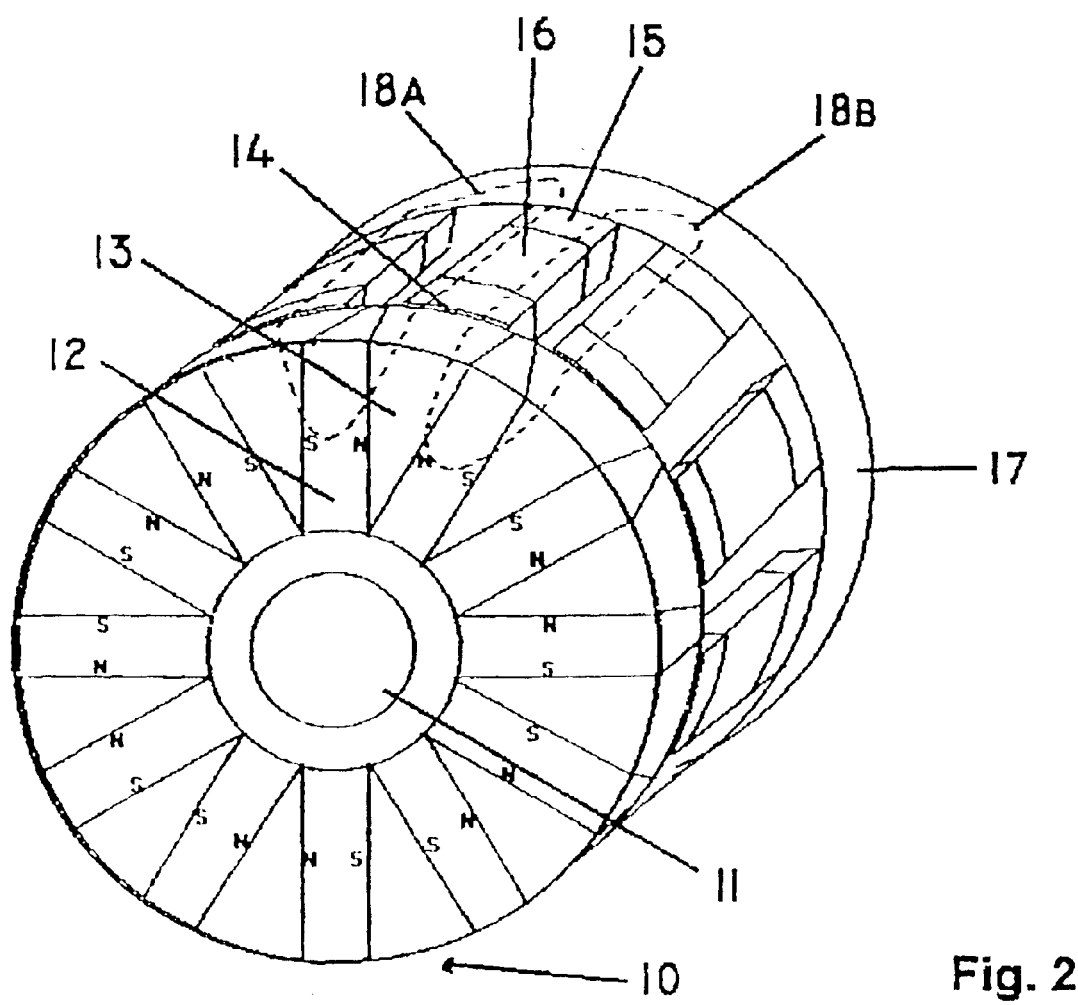
FIG. 2 shows a schematic view of an embodiment according to the invention.

FIG. 2 shows a schematic view of an embodiment according to the invention. The Figure shows a pole wheel (10) which functions as a rotor and is secured to a shaft (11). A plurality of magnets (12) is disposed radially in such a way that the magnets have poles of similar polarity (N) facing each other and poles of similar polarity (S) facing each other. The magnets (12) are preferably permanent magnets but could also be electromagnets or the like.

A plurality of pole shoes (13), preferably made of laminated sheet metal or massive iron, is disposed between the magnets (12), which concentrate the magnetic flux and have a relatively small remanence/residual magnetism, i.e. they are good magnetic conductors. The pole shoes (13) and the magnets (12) are magnetically isolated from the shaft (11).

Spaced apart from the rotor (10), a magnetic termination plate/end shield (17) is provided with a plurality of pole legs/pole cores (15) secured to the plate (17) in such a way that only an air gap (14) exists between the rotor (10) and the pole shoes (13). The plate (17) and the pole cores (15) function as a stator (15, 17). The plate (17) is preferably a circular core using non field orientated laminated iron wrapped in a circular shape using one length of iron.

The plate (17) functions as a magnetic 'short circuit' and conducts the magnetic flux between the relevant pole cores (15) in a given magnetic circuit. Thus, in this embodiment, a closed local magnetic circuit consists of: a magnet (12), a pole shoe (13), an air gap (14) (which amplifies the flux), a pole core (15), the magnetic termination plate (17), a adjacent pole core, a neighbor air gap, a neighbor pole shoe.

There are two adjacent local magnetic circuits for each given pole core (15). Two of these are schematically illustrated by the loops (18a, 18b).

Electrical windings (16), e.g. coils, preferably surround each of the pole legs (15). Preferably, the coils (16) are tightly and closely wound around the pole legs (15). This arrangement is very efficient with respect to induction in the windings/coils (16), since the flux is highly concentrated/uniform in the pole cores (15) in this arrangement. The windings (16) are preferably formed by flat concentrated coil, which has a high fill factor. By having the windings (16) concentrated on the pole cores (15) almost all of the coil material is affected, as opposed to the prior art generator shown in FIG. 1, since the flux flow affects almost all of the coil material (except of course the material conducting the current away from the generator).

When the rotor (10) is moved with respect to the stator (15, 17), the magnetic flux in a given pole core (15) changes direction, since the polarity at the air gap (14) changes (from N to S or vice versa), and current is thereby induced in the windings (16). This induction is very efficient, as mentioned, since the magnetic flux is highly concentrated/uniform in the area surrounded by windings (16), i.e. in the pole core (15).

For stand alone generators the shaft (11) is preferably rotatably mounted in a bearing or the like (not shown) in the plate (17) to support the shaft (11) additionally and stabilize the rotation of the rotor (10) with respect to the stator (15, 17). For generators used in wind turbines, the rotor (10) is preferably secured on the shaft of the wind turbines and the stator (15, 17) is preferably secured to a bearing holding the shaft of the wind turbines.

This embodiment also provides a simple way of obtaining a multiple phase output, since several (e.g. one for each phase) generators can be secured on the same shaft and their stators be angularly displaced with respect to one another, e.g. a third of the angle between two adjacent pole cores for three generators with rotors of the same orientation. This provides a multiple phase output without enlarging the diameter of the generator. This is very important in wind turbines, since the space used is very important in the radial direction but not so much in the longitudinal/axial direction.

Alternatively the stators could have the same orientation, and the rotors should then be angularly displaced with respect to one another to the same extent as is mentioned above.

Figure 3:
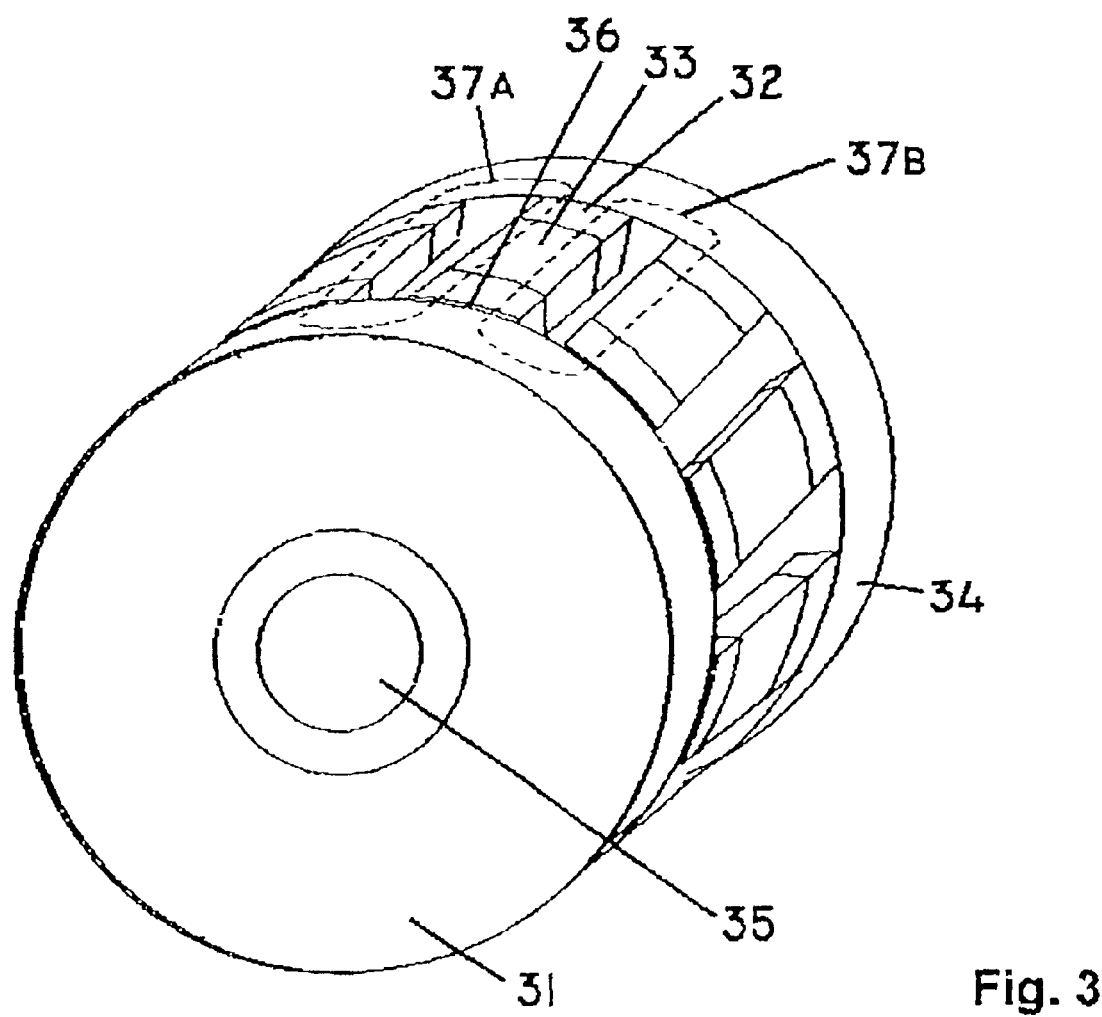
FIG. 3 shows a schematic view of another embodiment according to the invention.

FIG. 3 shows a schematic view of another embodiment according to the invention. The figure shows a rotor (31) magnetically isolated from and secured to a shaft (35), which may or may not extent through a magnetic termination plate (34), as described above. A plurality of pole cores (32) is secured on the plate (34) with windings (33) surrounding it. A stator (32, 34) is comprised of the pole cores (32) and the termination plate (34). The rotor (31) is spaced apart from the stator (32, 34) so that only an air gap (36) divides the two. This embodiment corresponds more or less to the one described in connection with FIG. 2, and differs only in the structure of the rotor (31) and the pole cores (32). This difference is illustrated in greater detail and explained in connection with FIGS. 4a–c in the following.

Additionally two local closed flux paths (37a, 37b) are shown. These flux paths is only a schematic view of the main path.

Figure 4A:
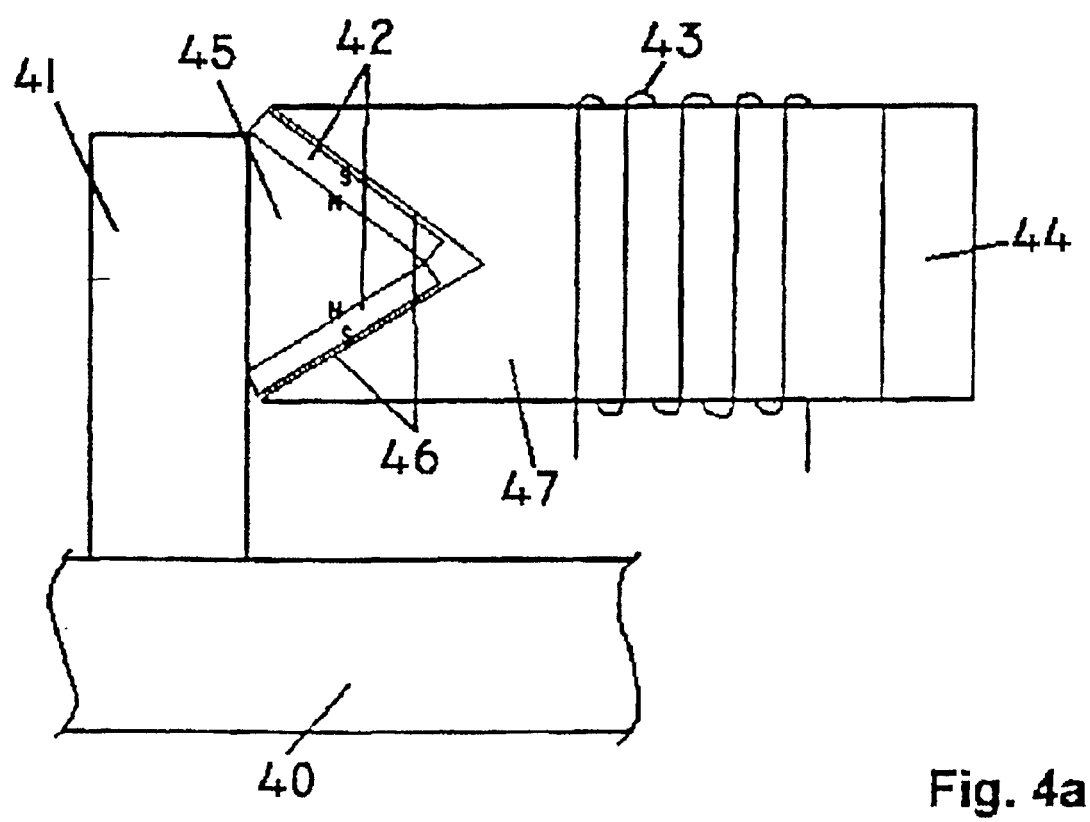
FIG. 4a illustrates a schematic longitudinal sectional view of the embodiment shown in FIG. 3.

FIG. 4a illustrates a schematic longitudinal sectional view of the embodiment shown in FIG. 3. Here a rotor (41) is secured on a shaft (40). Pole shoes (45) are radially secured on the rotor (41) and a given pole shoe (45) is surrounded vertically by two magnets (42). The two magnets (42) for a given pole shoe (45) have poles of similar polarity facing each other (e.g. N facing N as shown in the figure). The two adjacent pole shoes also have poles of similar polarity facing each other but with another polarity than their mutual neighbor. (e.g. S facing S for the two neighbors of the pole shoe (45) shown in FIG. 4). Spaced apart from the pole shoes (45) and the magnets (42), only separated by the air gap (46), are the pole cores (47), which are preferably made of a material having as small a remanence/residual magnetism as possible. The pole cores (47) are surrounded by windings (43), preferably wound closely and concentrated around it. The pole shoes (45) and the end of the pole cores (47) closest to the pole shoes (45) are both V-shaped in such a way that the pole shoes (45) with the magnets (42) fit into the pole cores (47), only spaced apart by the air gap (46). The magnetic flux in the pole cores (47) is even further concentrated/uniform in this kind of arrangement, since the magnets (42) 'fit' into the pole cores (47). This concentrated/uniform flux affects the windings (43) in a very efficient way since all the windings (43) surround the concentrated/uniform flux. A magnetic termination plate/end shield (49) is secured at the other (different from the one mentioned above) end of the pole cores (47), which 'short circuits' the magnetic circuit to another pole core.

In this embodiment the local magnetic circuits (see 37a and 37b in FIG. 3) are similar to the circuits described in connection with FIG. 2. The only difference is that a more concentrated/uniform flux is conducted in the pole shoe (45) due to the V-shape of the pole shoe (45) and of the one end of the pole core (47).

When the rotor (41) moves with respect to the stator, a current is induced in the windings (43) in the traditional manner, as described before.

Figure 4B:
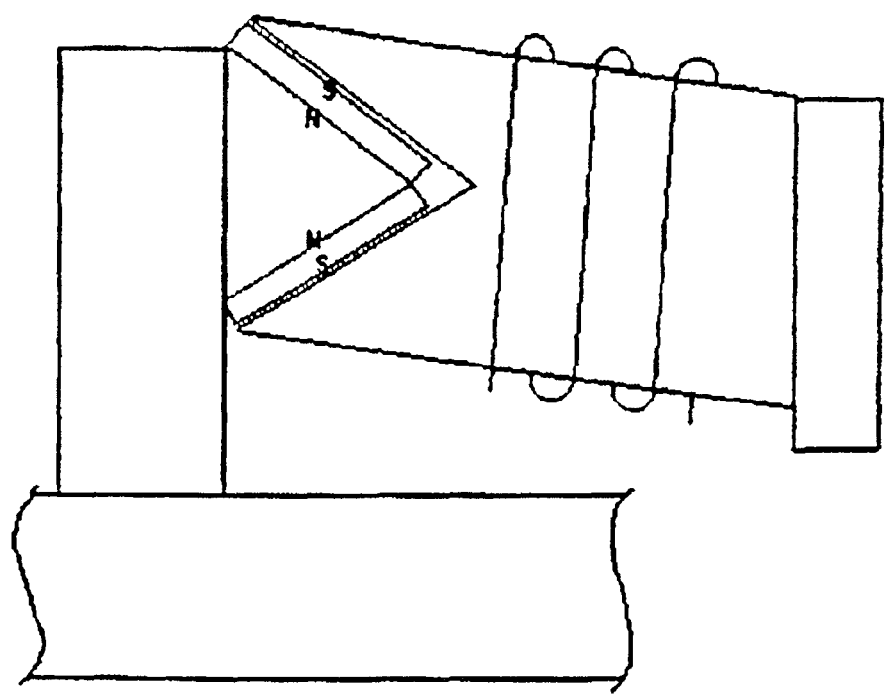
FIGS. 4b and 4c illustrate a sectional view of further embodiments according to the invention.
Figure 4C:
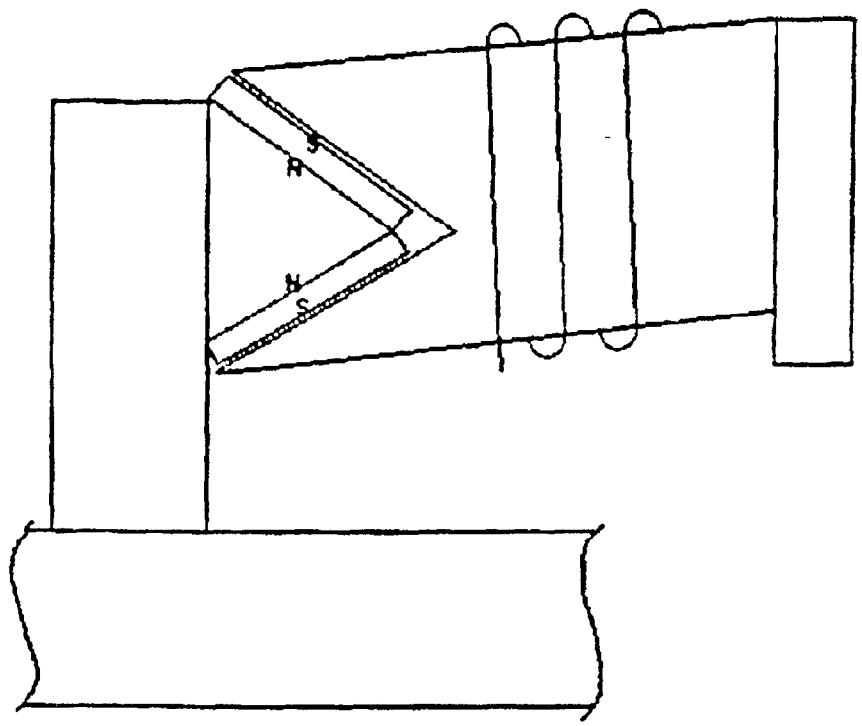

FIGS. 4b and 4c illustrate a sectional view of further embodiments according to the invention. These embodiments correspond to the embodiment in FIG. 4a, except that the pole cores (47) are angled with respect to the shaft (40). Thus, the pole cores (47) are not fully parallel to the axis of rotation.

Figure 13:
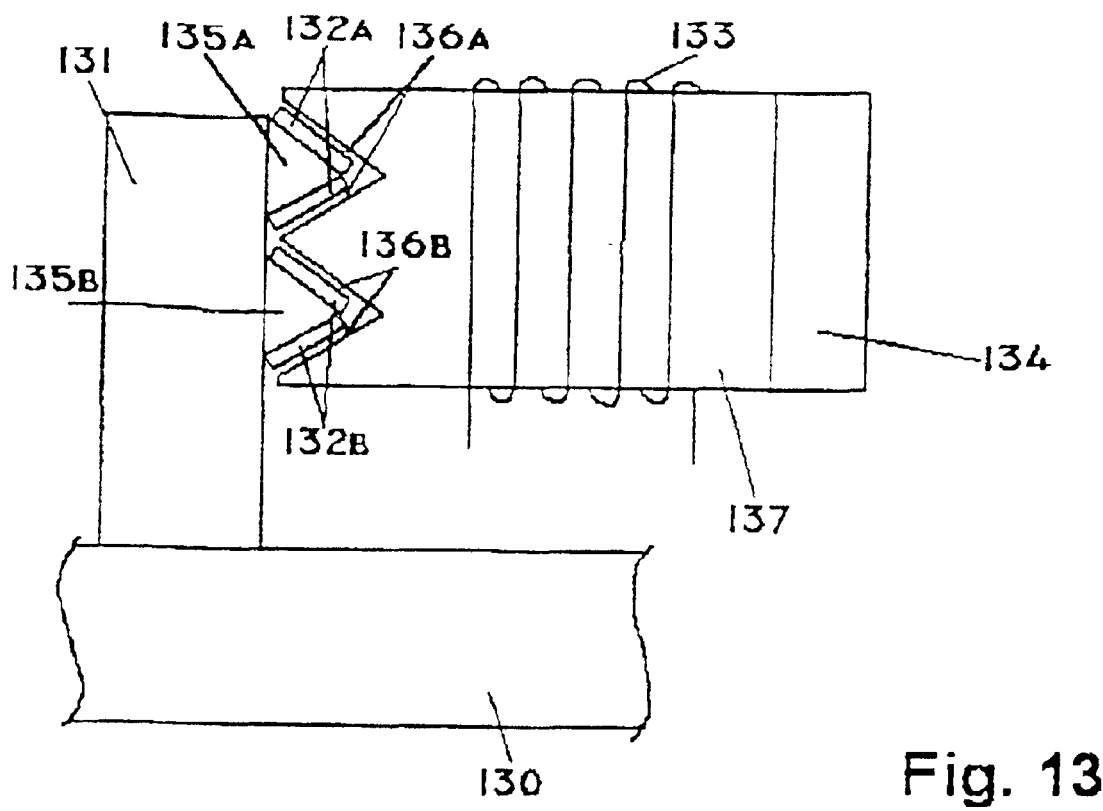
FIG. 13 illustrates a sectional view of a machine according to yet another embodiment of the invention.

FIG. 13 shows a sectional view of a generator according to yet another embodiment of the invention. The generator of this embodiment corresponds to the embodiment in FIG. 4a, except that instead of having a pole shoe and the corresponding pole core in the form of one V-shape, they are now formed into two V-shapes.

In FIG. 13 a rotor (131) is secured on a shaft (130).

Pole shoes (135a,b) are radially secured on the rotor (131) and a given pole shoe (135a or 135b) is surrounded vertically by two magnets (132a or 132b). The two magnets (132a or 132b) for a given pole shoe (135a or 135b) have poles of similar polarity facing each other (e.g. N facing N). Spaced apart from the pole shoes (135a,b) and the magnets (132a,b), only separated by the air gaps (136a,b), is a pole core (137). A pole core (137) is surrounded by a winding (133), preferably wound closely and concentrated around it. The pole shoes (135a,b) and the end of the pole core (137) closest to the pole shoes (135a,b) are both forming two V-shapes in such a way that the pole shoes (135a,b) with the magnets (132a,b) fit into the pole core (137), only spaced apart by the air gaps (136a,b). The stator comprises a number of pole cores (137) being secured to a stator or magnetic termination plate (134).

Figure 5:
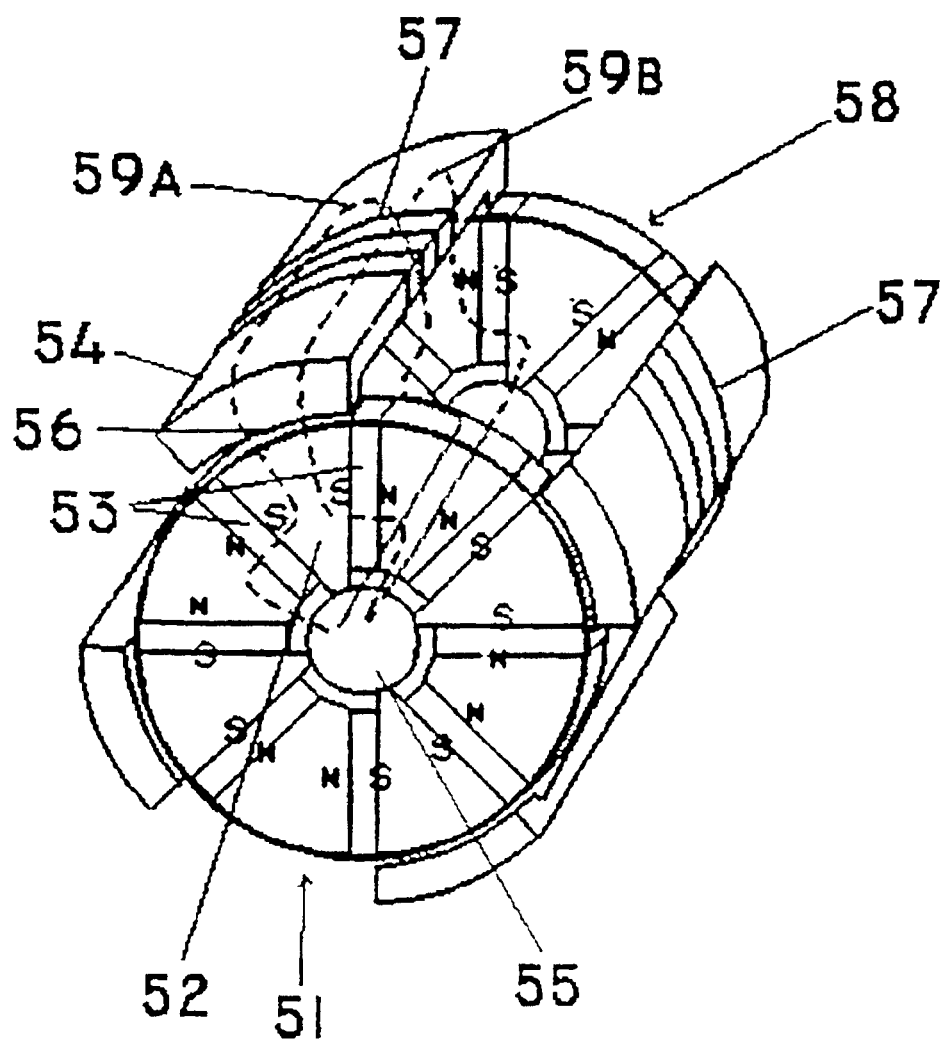
FIG. 5 illustrates a schematic view of another embodiment according to the invention.

FIG. 5 illustrates a schematic view of another embodiment according to the invention. The figure shows a generator with two identical rotors (51, 58). The rotors (51, 58) are secured to each opposing end of a shaft (55). The rotors comprise a plurality of magnets (53) radially and equidistantly spaced from the center of the rotors (51, 58). The magnets (53) are disposed in such a way that the polarity of a pole of a given magnet faces a similar polarity of a pole of an adjacent magnet, i.e. S faces S or N faces N. Pole shoes (52), which concentrate the flux from the magnets (53), are provided between the magnets (53). The rotors (51, 58) are staggered with respect to each other in such a way that the polarity in a given pole shoe (52) in one rotor (51) is different from the polarity of the pole shoe opposing it.

A plurality of pole legs/pole cores (54) is spaced apart from the radial extent of the rotors (51, 58), only separated by an air gap (56). The pole cores (54) are surrounded by windings (57).

Each pole core (54) is part of two different closed local magnetic circuits (59a, 59b). Each closed local magnetic circuit consists of: a pole shoe on the first rotor, an air gap, a pole core, an air gap, a pole shoe on the second rotor, a magnet on the second rotor, a second pole shoe on the second rotor, a shaft, a second pole shoe on the first rotor, a magnet on the first rotor.

When the rotors (51, 5a) move with respect to the pole cores (54), functioning as a stator, a current is induced in the windings (57).

Figure 6A:
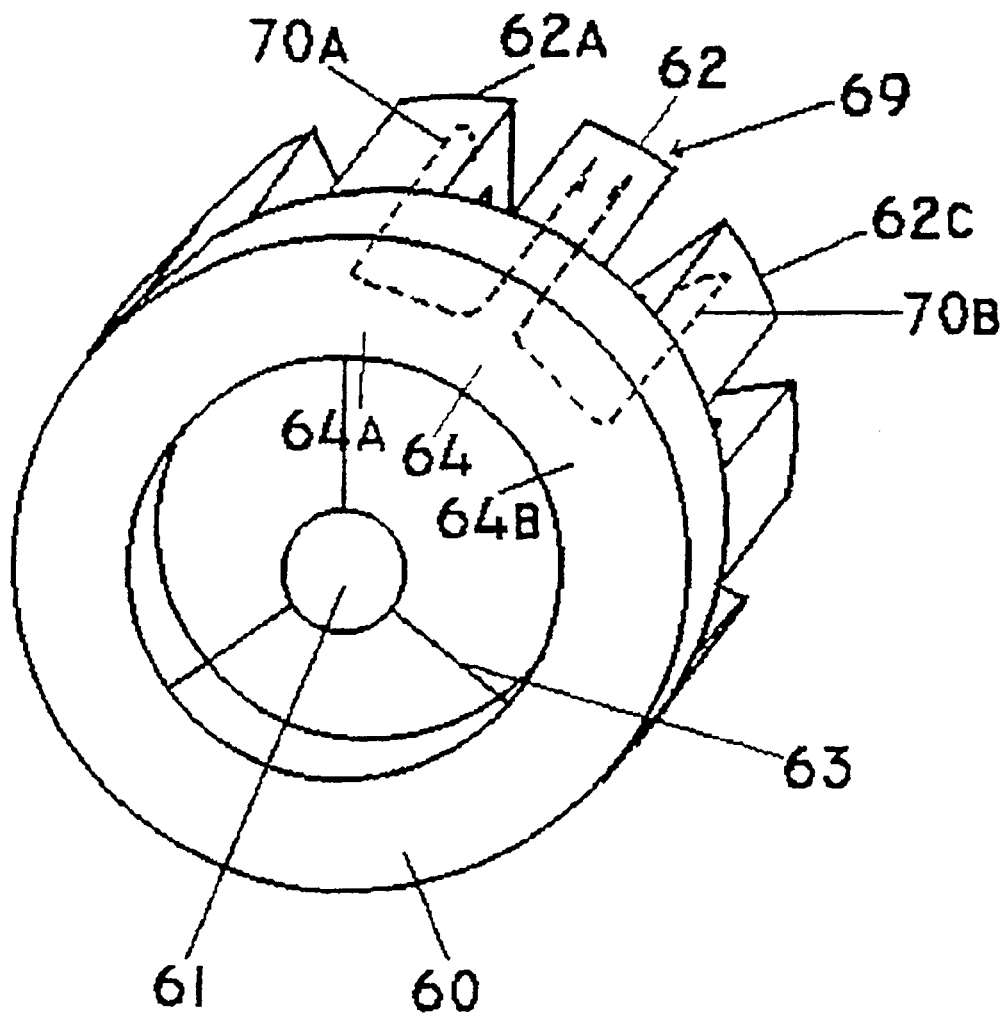
FIG. 6a shows a schematic view of yet another embodiment according to the invention.

FIG. 6a shows a schematic view of yet another embodiment according to the invention. The figure shows a rotor (60) secured to a shaft (61) via a plurality of braces (63). The rotor (60) is spaced apart from a stator (69) comprising a plurality of pole cores (62). The pole cores (62) of this embodiment are angled substantially 90°, so that they are secured directly on the shaft (61). This reduces the axial length of the pole cores (62) and thus the axial length of the generator itself. This embodiment will be explained in greater detail in connection with FIG. 6b.

Figure 6B:
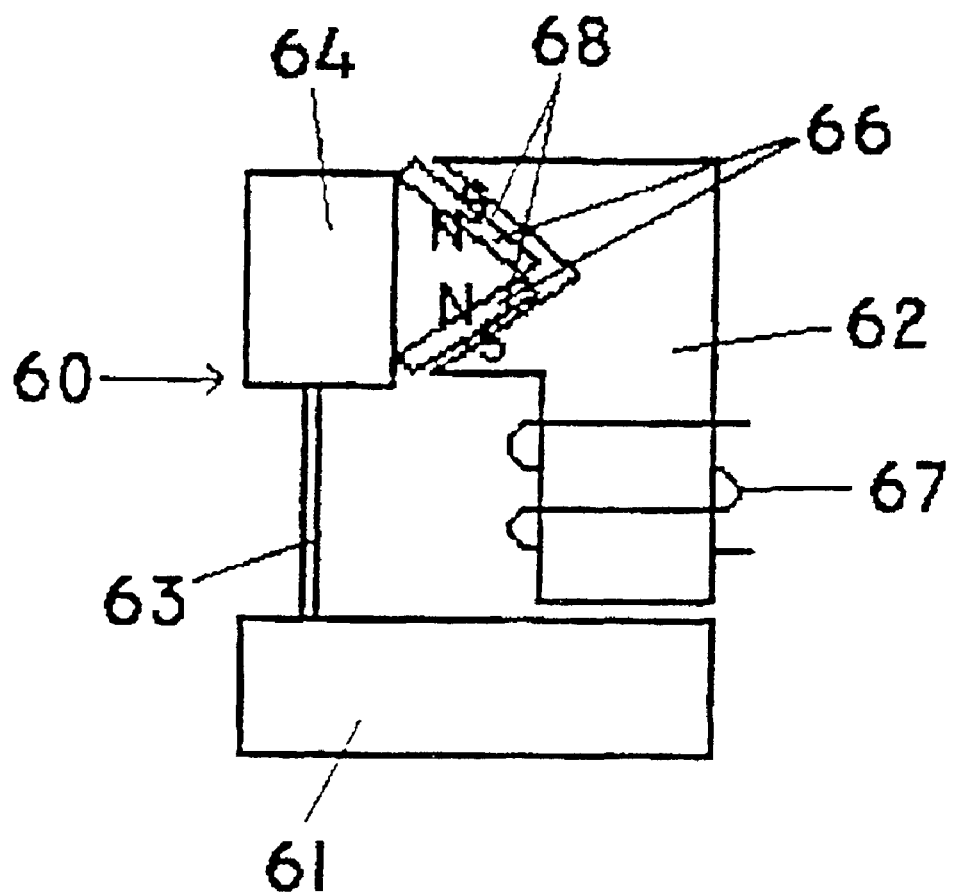

FIG. 6b illustrates a schematic longitudinal sectional view of the embodiment shown in FIG. 6a. The figure shows a rotor (60) secured to a shaft (61). The rotor (60) comprises a pole wheel (64) with pole shoes (65) secured to it and a plurality of braces (63) supporting the pole wheel (64). Two magnets (66) are secured to each pole shoe (65) and have poles of similar polarity facing each other, i.e. N facing N like in the figure or S facing S. The two adjacent pole shoes (65) have magnets (66) having poles of opposite polarity facing each other, i.e. the polarity of the poles facing each other alternates between N and S. Pole cores (62) are spaced apart, by an air gap (68), from the magnets (66) and the pole shoes (65). The pole shoes (65) and the pole cores (62) are both V-shaped so that they can 'fit together' (only separated by the air gap (66)). This enhances the magnetic flux concentrated in the pole cores (62).

The pole cores (62) are angled substantially 90°, as described above in connection with FIG. 6a, and have windings (67) surrounding it. The windings (67) are preferably formed by flat concentrated coils wound tightly and closely around the pole cores (62). This provides a very efficient induction in the windings (67), since the uniform/concentrated magnetic flux in the pole cores (62) affects almost all of the winding material.

Figure 6C:
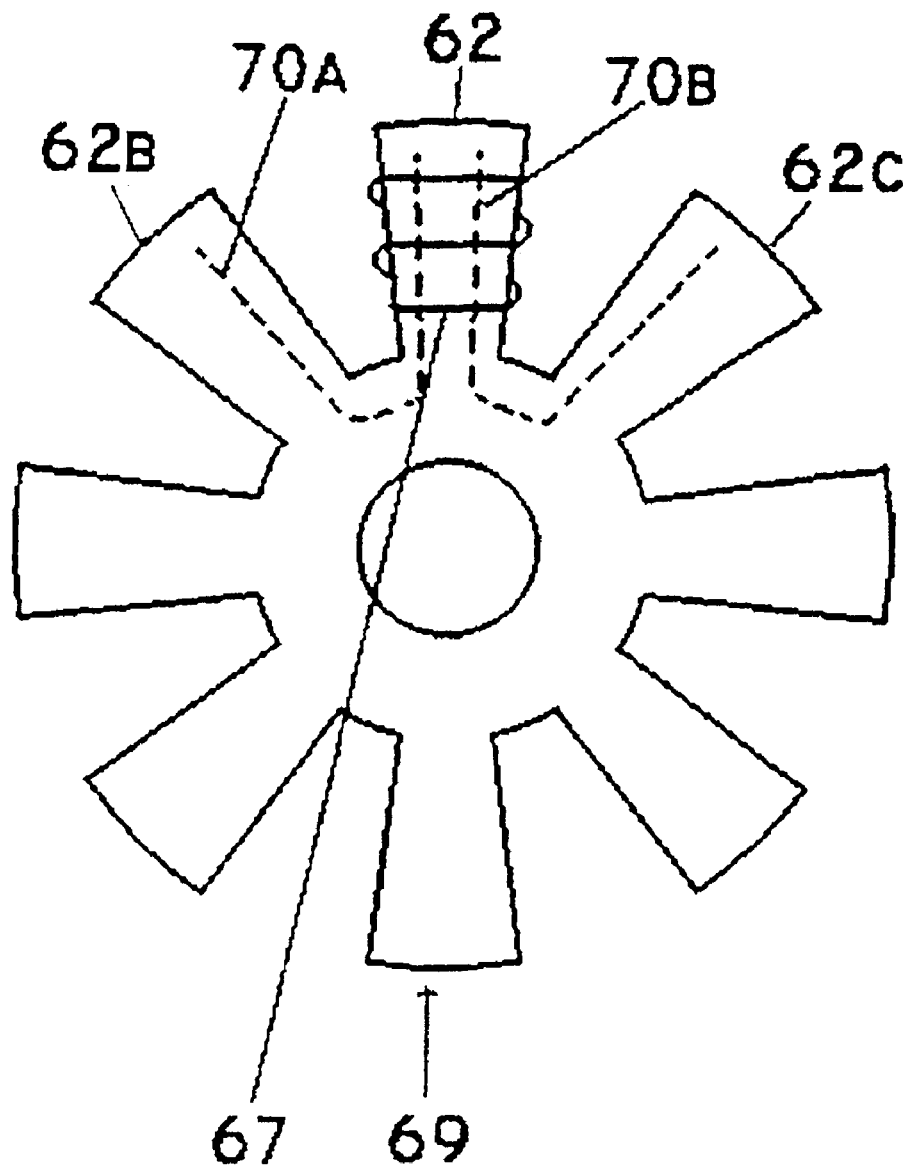
FIG. 6c shows the stator of the embodiment shown in FIGS. 6a and 6b seen from one end.

FIG. 6c shows the stator of the embodiment shown in FIGS. 6a and 6b seen from one end. Here the stator (69) is shown from one side where the axial ends of the pole cores (62) points into the paper. Also shown is one exemplary winding (67).

In this embodiment a local magnetic circuit is provided for each pole core and each of its neighbors. The pole core (62a) shown in FIGS. 6a–c is part of two local magnetic circuits. One (70b) with its adjacent pole core (62b) and another (70c) with its other adjacent pole core (62c), since, as mentioned above, the two neighbor pole shoes (not shown) have magnets of opposite polarity facing each (e.g. S facing S). I.e. the closed local magnetic circuit (70b) consists of: The local part of the pole wheel (64), the pole shoe (65), the two magnets (66), the air gap (68), the pole core (62), the adjacent pole core (62b), an adjacent air gap (not shown), two adjacent magnets (not shown), an adjacent pole shoe (not shown) and an adjacent part of the pole wheel (64b).

In a similar manner, the closed local magnetic circuit (70c) consists of: The local part of the pole wheel (64), the pole shoe (65), the two magnets (66), the air gap (68), the pole core (62), the adjacent pole core (62c), an adjacent air gap (not shown), two adjacent magnets (not shown), an adjacent pole shoe (not shown) and an adjacent part of the pole wheel (64c).

Since the flux in each local magnetic circuit has the same orientation in the shared pole core, they both contribute positively to the total flux in the shared pole core, giving a very effective induction in the surrounding windings.

When the rotor (60) moves with respect to the stator, the magnetic flux in the magnetic circuits changes orientation, which induces current in the windings (67). The V-shape and the arrangement of the magnets (66) and the pole shoes (65) together with the windings (67) surrounding the pole cores (62) give a very high output of current for even a small speed of rotation, which is very useful particular in wind turbines.

Figure 7A:
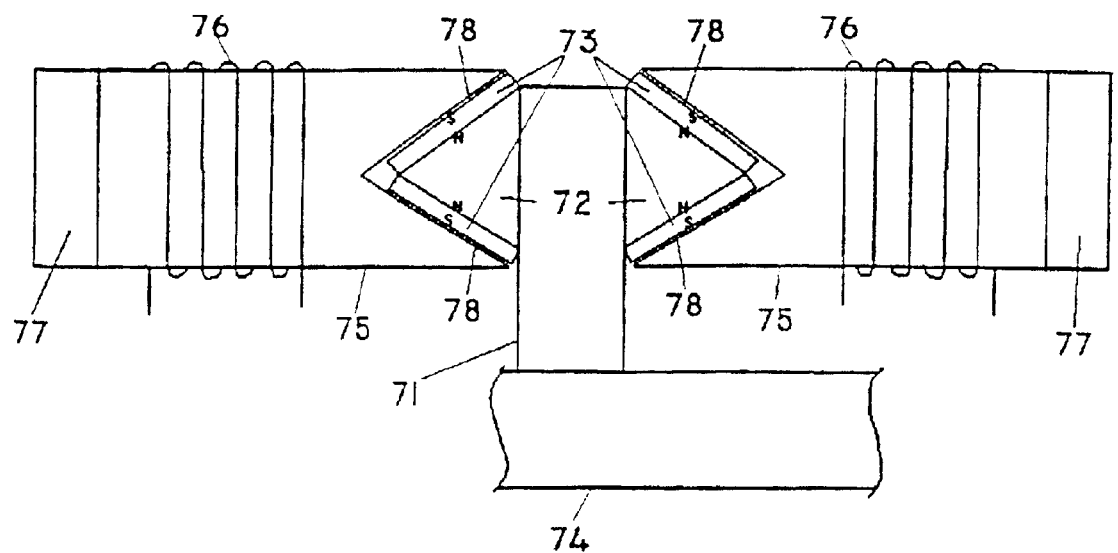
FIG. 7a shows a schematic sectional view of two generators connected in series according to an embodiment of the invention.

FIG. 7a shows a schematic sectional view of two generators connected in series according to an embodiment of the invention. Here each of two pole shoes (72) surrounded by two magnets (73) is secured to a rotor (71), which itself is secured to a shaft (74). The magnets are arranged so that they have poles of similar polarity facing each other (e.g. N facing N). A pole core (75) is spaced apart from the magnets (73) on each side of the rotor (71) only separated by an air gap (78). Windings (76) surround each of the pole cores (75). At one end of the pole cores (75), a back plate/end shield (77) is provided to conduct the magnetic flux to an adjacent pole core (75).

The pole shoes (72) and the pole cores (75) are V-shaped so that the pole shoes (72) with magnets (73) can fit into the pole core (75) only separated by the air gaps (78), which concentrate the magnetic flux in the pole cores (75).

The stators correspond to the stators described in connection with FIGS. 3 and 4. The only difference is that only one rotor is needed for both of the stators. This reduces the material needed and also provides a very easy way to obtain a multiple phase output.

Figure 7B:
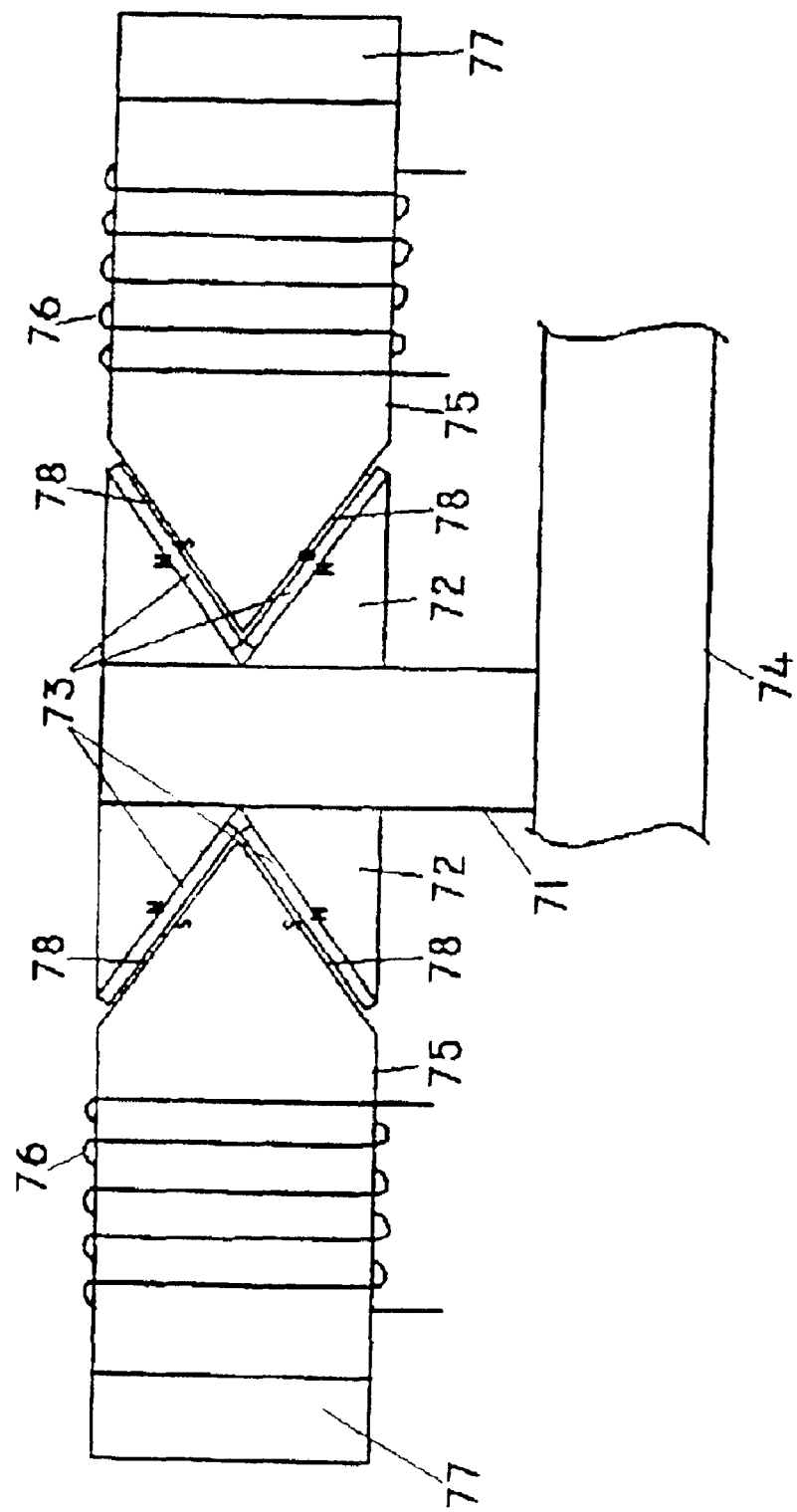
FIG. 7b shows a schematic sectional view of two generators connected in series according to another embodiment of the invention.

FIG. 7b shows a schematic sectional view of two generators connected in series according to another embodiment of the invention. This embodiment corresponds to the embodiment described above in connection with FIG. 7a. The only difference is that the V-shape has been changed so that the pole cores (75) can now fit into the pole shoes (72) with the magnets (73) only separated by the air gaps (78).

Figure 8:
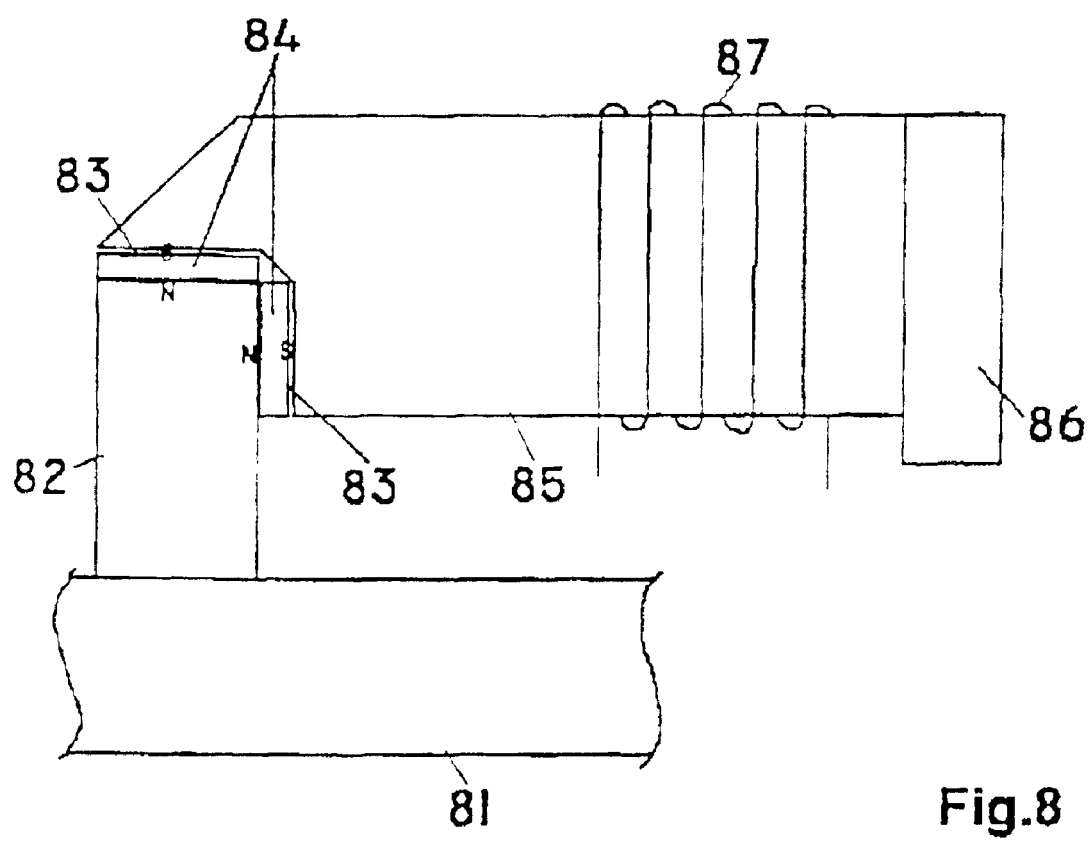
FIG. 8 shows a sectional view of a generator with a different arrangement of the magnets according to an embodiment of the invention.

FIG. 8 shows a sectional view of a generator with a different arrangement of the magnets according to an embodiment of the invention. In this embodiment a rotor (82) is secured to a shaft (81) like in the examples mentioned above. Two magnets (84) are secured to the rotor (82), one being secured to the top, the other being secured at the top of one of the sides facing a pole core (85) so that the magnets (84) form an L-shape. The pole core (85) has a cut-out so that the rotor (82) and the magnets (84) fit into this cut-out only separated by air gaps (83). Windings (87) surround the pole core (85). A back plate/end shield (86) is secured at the other end of the pole core (85). This embodiment differs from the other embodiments by the magnets (83) being arranged in an L-shape, by the cut-out in the pole cores (85) and by the absence of a pole shoe, but otherwise functions in a similar manner.

Figure 9:
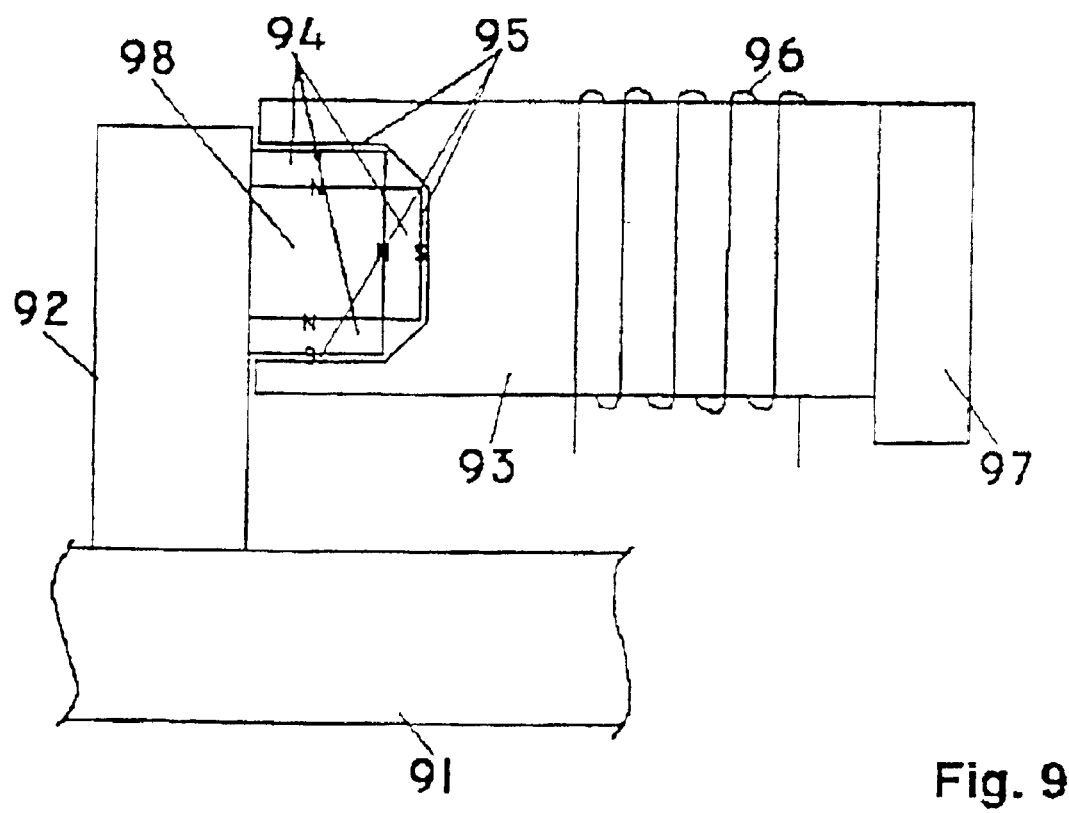
FIG. 9 shows a sectional view of a generator with a different arrangement of the magnets according to another embodiment of the invention.

FIG. 9 shows a sectional view of a generator with a different arrangement of the magnets according to another embodiment of the invention. Here, a substantially square or rectangular pole shoe (98) is secured to a rotor (92) and have magnets (98) secured at the other sides, as shown in the figure. A pole core (93) has a U-shaped cut-out, and the magnets (95) and the pole shoe (98) fit into this cut-out only separated by air gaps (95). The pole core (93) is surrounded by windings (96) and is secured to a back plate/end shield (97). The generator functions in a manner similar to the ones described above and differs only in the arrangement of the pole shoe (98), the magnets (94) and the U-shaped cut-out.

Figure 10:
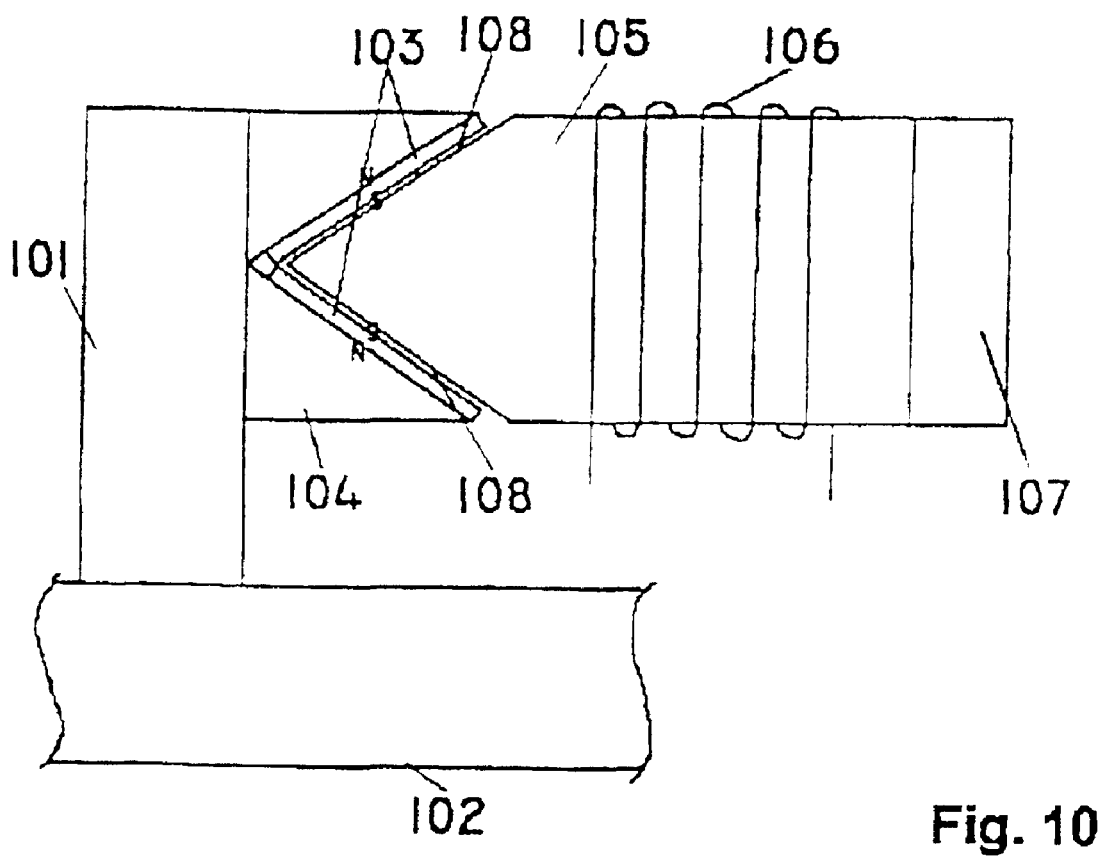
FIG. 10 illustrates a sectional view of a generator according to yet another embodiment of the invention.

FIG. 10 illustrates a sectional view of a generator according to yet another embodiment of the invention. This generator corresponds to the generator shown in FIG. 4 and differs only in that the V-shape has been changed so that the pole cores (105) can now fit into the pole shoes (104) with the magnets (103) only separated by the air gaps (108).

Figure 11:
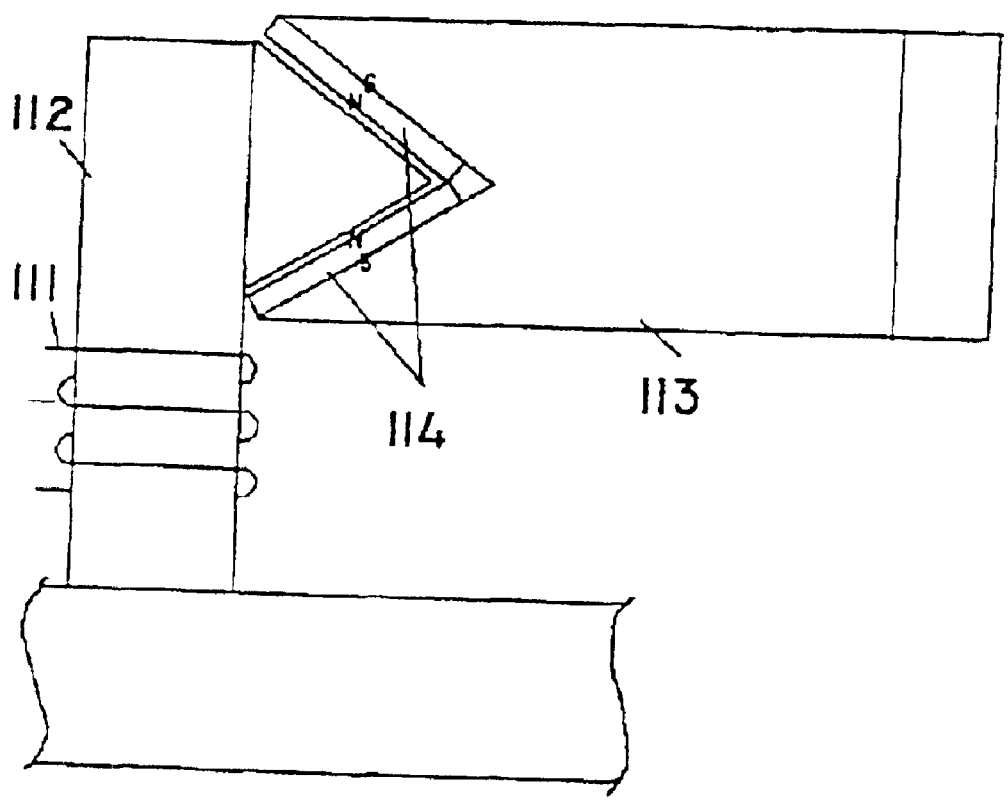
FIG. 11 shows a sectional view of a generator according to another embodiment of the invention.

FIG. 11 shows a sectional view of a generator according to another embodiment of the invention. This embodiment differs from the embodiment shown in FIG. 10 in that pole cores (112) are arranged in the rotor with the windings (111) surrounding the pole cores (112). The magnets (114) are then arranged in the stator (113) in order to generate a varying magnetic flux in the windings (111). This modification may be applied to other embodiments according to the invention.

Figure 12:
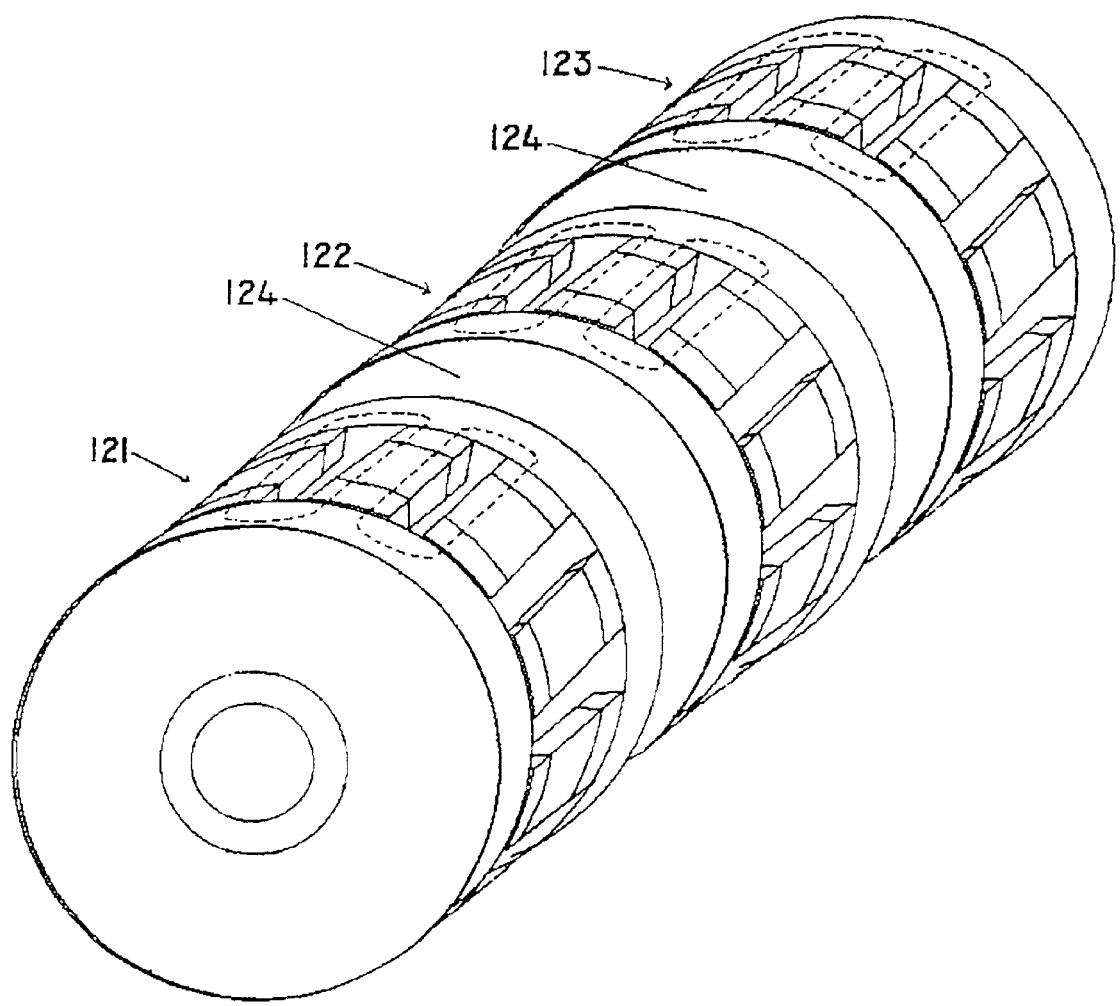
FIG. 12 shows a perspective view of embodiments according to the invention coupled in series.
Figure 14:
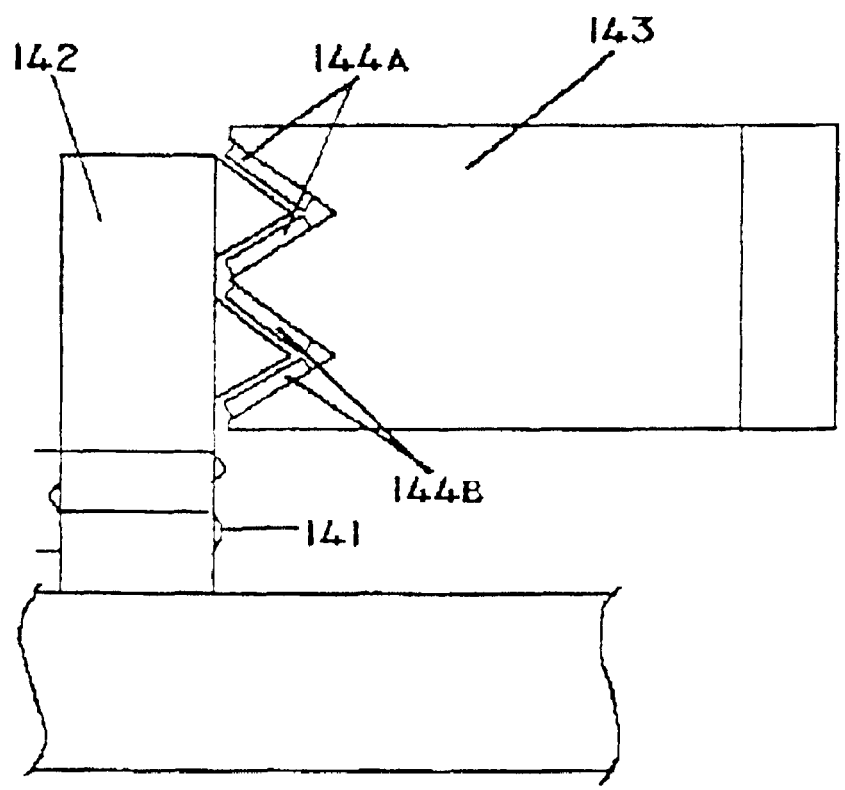
FIG. 14 shows a sectional view of a machine according to another embodiment of the invention.

FIG. 14 shows a sectional view of a machine according to another embodiment of the invention. The generator of this embodiment corresponds to the embodiment in FIG. 11, except that instead of having a pole shoe and the corresponding pole core in the form of one V-shape, they are now formed into two V-shapes. In FIG. 14 pole cores (142) are arranged in the rotor with the windings (141) surrounding the pole cores (142). The magnets (144a,b) are then arranged in the stator (143) in order to generate a varying magnetic flux in the windings (141). FIG. 12 shows a perspective view of embodiments according to the invention coupled in series. Here three (121, 122, 123) of the embodiments shown in FIG. 3 are connected in series on the same shaft. They are staggered with respect to each other so that a multiple phase output is provided without enlarging the diameter of the generator, since each embodiment provides a phase. The rotor parts (124) may consist of two rotors of the above mentioned kind placed back to back or a single modified rotor part where the rotor has two sets of pole shoes, magnets etc. on each side.

Figure 15:
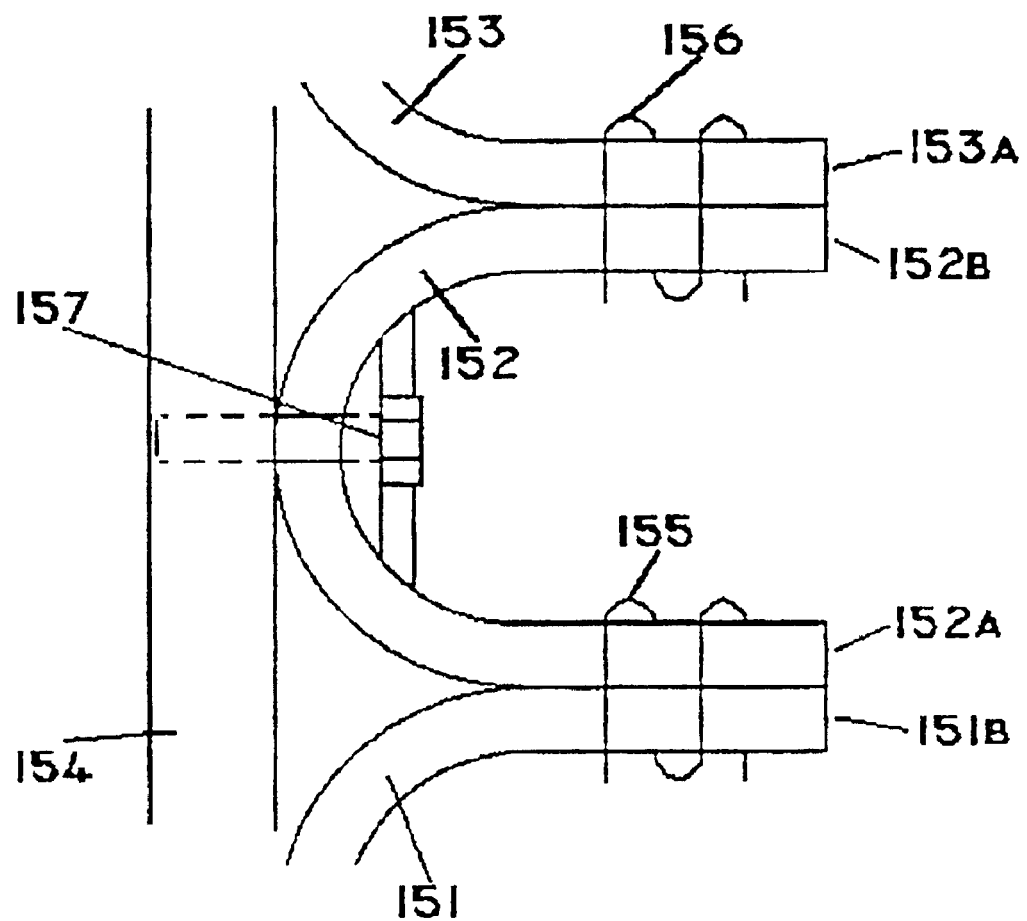
FIG. 15 shows a sectional view of part of a stator according to an embodiment of the invention.

FIG. 15 shows a sectional view of part of a stator according to an embodiment of the invention. In this embodiment, a pole core or a pole leg is formed of two adjacent legs (151b, 152a) or (152b, 153a) of two U-shaped pole core elements (151, 152) or (152, 153). The U-shaped elements (151, 152, 153) are secured to a stator end plate (154) with windings (155, 156) surrounding the pole cores (151b, 152a) and (152b, 153a). A pole core element (152) may be secured to the end plate (154) by fastening means (157).

Figure 16:
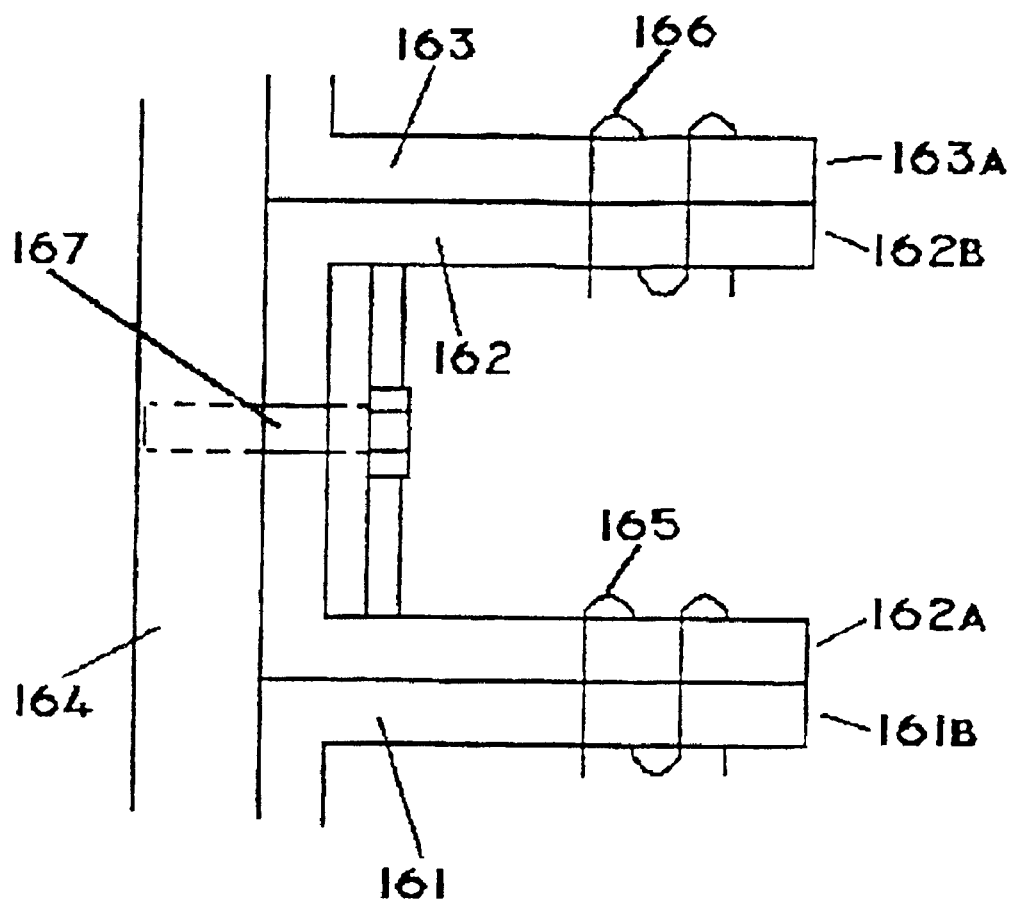
FIG. 16 shows a sectional view of another embodiment of a stator built on the same principles as the stator of FIG. 15.

FIG. 16 shows a sectional view of another embodiment of a stator built on the same principles as the stator of FIG. 15.

Here the U-shaped pole core elements are formed in a square formed U-shape. Again a pole core or a pole leg is formed of two adjacent legs (161b, 162a) or (162b, 163a) of two U-shaped pole core elements (161, 162) or (162, 163). The U-shaped elements (161, 162, 163) are secured to a stator end plate (164) with windings (165, 166) surrounding the pole cores (161b, 162a) and (162b, 163a), and the pole core element (162) may be secured to the end plate (164) by fastening means (167).

It has been mentioned that for the U-shaped pole core elements, a magnetic flux path going through two pole cores will have its flux path along the U-shape in both legs of the U-shaped pole core element. Thus, it is preferred that the U-shaped pole legs or pole cores are made of a magnetic conducting material, while it is preferred that the stator end plate is made of a material having a low magnetic conductivity and low electronic conductivity.

It is also preferred that an electronic isolation is provided between the U-shaped pole core element (152, 162) and the stator end plate (154,164).

Figure 17:
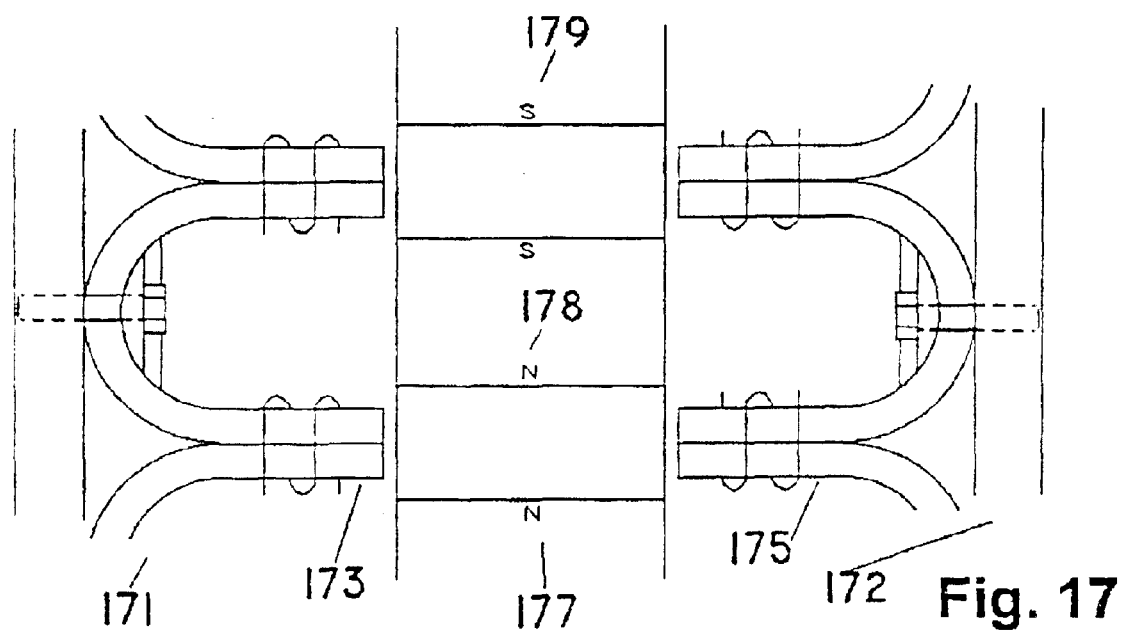
FIG. 17 shows a sectional view of an embodiment of the invention comprising one rotor and two stators.

FIG. 17 shows a sectional view of an embodiment of the invention comprising one rotor and two stators. Here, the two stators 171, 172 have U-shaped pole core elements of the type shown in FIG. 15, and the pole core or pole legs 173, 174 and 175, 176 are facing a rotor 177 having pole shoes 178, 179 and a magnet between the pole shoes 178, 179. The pole shoes 178, 179 are crossing the rotor 177, whereby pole shoes are provided on each side of the rotor. The width of the pole shoes 178,179 may correspond to the width of the pole legs 173, 174 and 175, 176. The N pole of the magnet is facing pole shoe 178, while the S pole is facing pole shoe 179. Correspondingly, the N pole of a second magnet is facing the other side of pole shoe 178, while the S pole of a third magnet is facing the other side of pole shoe 179.

In FIG. 17, the pole legs 173, 174 are opposing the pole legs 175, 176, with the result that corresponding electrical signals of the two stators 171 and 172 are in phase.

However, if the position of the pole leg of the second stator is displaced compared to the position of the pole legs of the first stator, corresponding electrical signals of the two stators will be out of phase. The phase difference can be determined by the displacement of the pole legs.

Figure 18:
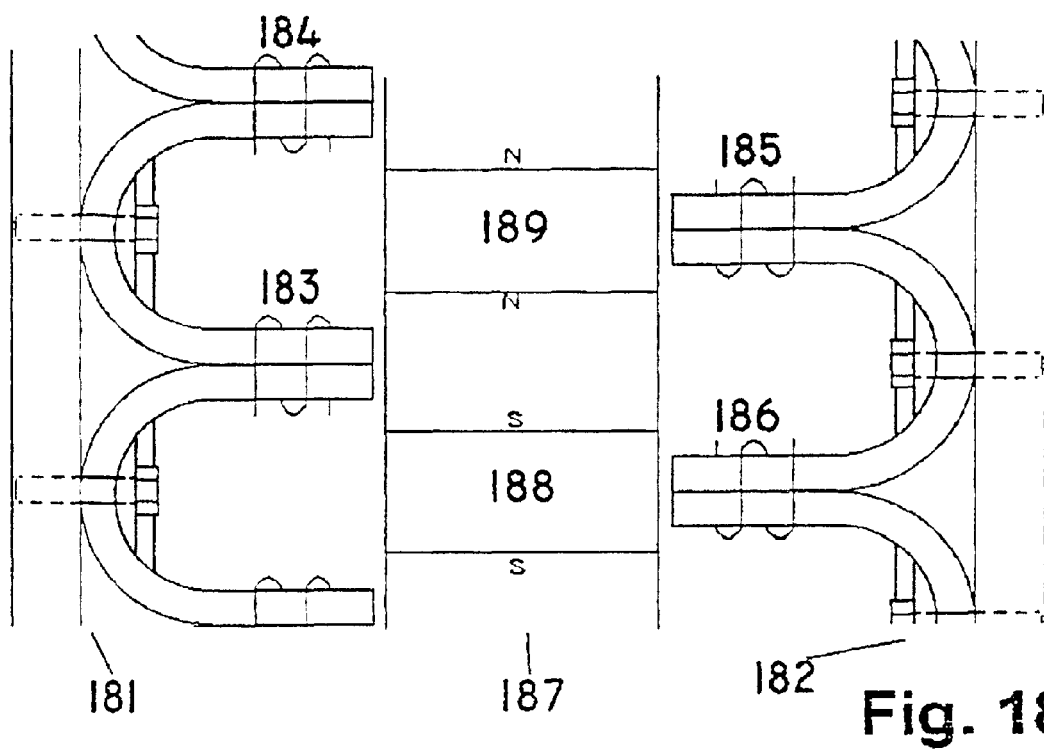
FIG. 18 shows a sectional view of another embodiment of the invention comprising one rotor and two stators.

This is illustrated in FIG. 18, which shows a sectional view of an embodiment of the invention comprising one rotor 187 and two stators 181, 182. Here, the pole legs 186, 185 of the second stator 182 are displaced in relation to the position of the pole legs 183, 184 of the first stator 181. Thus, the pole shoes 188, 189 will reach the pole legs 183, 184 and 186, 185 at different times resulting in a phase difference in the electrical signals.

In should be understood that for electrical machines of the present invention, the stator may in most cases comprise a relatively large number of separate pole cores or pole legs (for example 40 pole cores) and a corresponding number of separate or discrete coils or set of windings.

Such as large number of discrete and galvanic separated coils gives the opportunity of forming a very large number of combinations of voltages and currents.

A few examples:
all coils of one stator may be arranged in series to produce a high voltage;
all coils of one stator may be arranged in parallel to obtain the same voltage as of one coil, but a higher current;
one, two, three or more coils arranged in parallel may be arranged in series with one, two, three or more coils arranged in parallel, all coils being part of the same stator.

What is claimed is:

1. A electrical machine comprising:
   a rotor secured to a shaft with an axis of rotation, said rotor comprising a plurality of magnets or means for producing a magnetic field,
   a stator with air gaps formed between the rotor and the stator, said stator comprising a plurality of separate pole cores having corresponding separate coils or set of windings wound on and surrounding said pole cores, said pole cores being arranged so that at least a portion of one or more of the pole cores is arranged at an angle to the axis of rotation, said angle being equal to or greater than 0 degrees and below 90 degrees, and said pole cores providing part(s) of ore or more magnetic flux paths,
   wherein a magnetic flux path includes two and only two pole cores and two and only two air gaps.

2. An electrical machine according to claim 1, wherein the plurality of magnets or means for producing a magnetic field are arranged in pairs having poles of similar polarity facing each other.

3. An electrical machine according to claim 1, wherein each separate pole core has a corresponding separate coil or set of windings.

4. An electrical machine according to claim 1, wherein the rotor is arranged so that at least part of the rotor is substantially perpendicular to the axis of rotation.

5. An electrical machine according to claim 1, wherein the angle is equal to or below 45 degrees.

6. An electrical machine according to claim 1, wherein the angle is equal to or below 30 degrees.

7. An electrical machine according to claim 1, wherein at least a portion of one or more of the pole cores is substantially parallel to the axis of rotation.

8. An electrical machine according to claim 7, wherein one or more windings or coils have their axis substantially parallel to the axis of rotation.

9. An electrical machine according to claim 1, wherein one or more pole cores have a portion arranged substantially perpendicular to the axis of rotation of the shaft.

10. An electrical machine according to claim 9, wherein one or more windings or coils have their axis substantially perpendicular to the axis of rotation.

11. An electrical machine according to claim 1, wherein the rotor is circular.

12. An electrical machine according to claim 1, wherein the stator further comprises a magnetic conductive end plate connected to said pole legs or cores.

13. An electrical machine according to claim 12, wherein the end plate is arranged substantially parallel and opposite to the rotor.

14. An electrical machine according to claim 1, wherein the number of pole cores equals the number of magnets or means for producing a magnetic field.

15. An electrical machine according to claim 1, wherein the magnets or means for producing a magnetic field are located radially and equidistantly in the rotor.

16. An electrical machine according to claim 15, wherein pole shoes are arranged between the magnets or means for producing a magnetic field.

17. An electrical machine according to claim 16, wherein the width of a pole shoe at the outer periphery of the rotor is substantially equal to the width of a pole core oppositely arranged in the stator.

18. An electrical machine according to claim 1, wherein the magnets or means for producing a magnetic field are located on one side of the rotor facing ends of the pole cores.

19. An electrical machine according to claim 1, wherein the magnets or means for producing a magnetic field are located on the outer periphery of the rotor.

20. An electrical machine according to claim 1, wherein magnets or means for producing a magnetic field are arranged on the rotor to fit substantially into a V-shape.

21. An electrical machine according to claim 20, wherein the magnets or the means for producing a magnetic field are arranged in pairs to obtain said V-shape.

22. An electrical machine according to claim 20, wherein the magnets or means for producing a magnetic field are arranged on the rotor to fit substantially into two or more V-shapes.

23. An electrical machine according to claim 22, wherein each V-shape comprises a pair of magnets or means for producing a magnetic field.

24. An electrical machine according to claim 1, wherein the machine is a synchronous one phase machine.

25. A multiphase machine, wherein a number of phases is obtained by arranging a corresponding number of one phase machines according to claim 24.

26. An electrical machine according to claim 1, wherein the magnets or means for producing a magnetic field are permanent magnets.

27. An electrical machine according to claim 1, wherein the magnets or means for producing a magnetic field am electromagnets.

28. An electrical machine according to claim 1, wherein a winding or coil is formed by a flat concentrated coil.

29. An electrical machine according to claim 1, wherein the pole cores are assembled of a magnetic conducting material.

30. An electrical machine according to claim 29, wherein the magnetic conducting material is a field oriented soft magnetic lamination.

31. An electrical machine according claim 1, wherein the machine is a generator which may be provided with a mechanical force/power via said shaft to generate an electrical power via said windings.

32. An electrical machine according to claim 31, wherein said machine is used in a wind turbine.

33. An electrical machine according to claim 1, wherein the pole cores are formed by U-shaped elements, said elements being arranged in the stator so that one pole core is formed by two adjacent legs of two U-shaped elements.

34. An electrical machine according to claim 33, wherein a magnetic flux path is going through two pole cores and having its path in both legs of one U-shaped pole core element.

35. An electrical machine according to claim 1, wherein the pole cores are made of a magnetic conducting material, and wherein the pole cores are arranged on a stator plate made of a material having a low magnetic conductivity.

36. An electrical machine according claim 1, wherein the width of a pole core is substantially equal to the distance between two successive pole cores.

37. An electrical machine according to claim 1, wherein a first stator is arranged opposite to and facing a first side of the rotor, and a second stator is arranged opposite to and facing the other side of the rotor.

38. An electrical machine comprising:
   a rotor secured to a shaft with an axis of rotation, said rotor comprising a plurality of magnets or means for producing a magnetic field, a stator with air gaps formed between the rotor and the stator, said stator comprising a plurality of separate pole cores having corresponding separate coils or set of windings wound on and surrounding said pole cores, said pole cores being arranged so that at least a portion or one or more of the pole cores is arranged at an angle to the axis of rotation, said angle being equal to or greater than 0 degrees and below 90 degrees, and said pole cores providing part(s) of one or more magnetic flux paths, wherein the plurality of magnets or means for producing a magnetic field are arranged in pairs having poles of similar polarity facing each other.

39. An electrical machine according to claim 38, wherein a magnetic flux path includes flux pats through two pole cores.

40. An electrical machine according to claim 39, wherein a magnetic flux path includes two and only two pole cores and two and only two air gaps.

* * * * *